US010637999B2

United States Patent
Watariuchi

(10) Patent No.: US 10,637,999 B2
(45) Date of Patent: Apr. 28, 2020

(54) IMAGE FORMING APPARATUS THAT CONVERTS A FILE RESTRICTION INTO A SCAN FUNCTION RESTRICTION, METHOD OF CONTROLLING THE SAME AND COMPUTER-READABLE STORAGE MEDIUM

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/361,686

(22) Filed: Mar. 22, 2019

(65) Prior Publication Data

US 2019/0306333 A1     Oct. 3, 2019

(30) Foreign Application Priority Data

Mar. 29, 2018     (JP) ................................. 2018-065497

(51) Int. Cl.
| | | |
|---|---|---|
| *G06F 15/00* | (2006.01) | |
| *G06K 1/00* | (2006.01) | |
| *G06K 15/00* | (2006.01) | |
| *H04N 1/00* | (2006.01) | |

(52) U.S. Cl.
CPC ..... *H04N 1/00222* (2013.01); *H04N 1/00244* (2013.01); *H04N 1/00464* (2013.01); *H04N 1/00474* (2013.01); *H04N 1/00915* (2013.01); *H04N 1/00925* (2013.01); *H04N 2201/0094* (2013.01)

(58) Field of Classification Search
CPC ........... H04N 1/00222; H04N 1/00244; H04N 1/00464; H04N 1/00474; H04N 1/00915; H04N 1/00925; H04N 2201/0094
USPC ............................... 358/1.14, 1.15, 1.13, 1.1
See application file for complete search history.

(56) References Cited

U.S. PATENT DOCUMENTS

| | | | |
|---|---|---|---|
| 9,906,400 B2 | 2/2018 | Watariuchi | |
| 10,051,154 B2 | 8/2018 | Sugiyama et al. | |
| 2005/0108353 A1 | 5/2005 | Yamamoto | |
| 2009/0100060 A1* | 4/2009 | Livnat | G06F 21/10 |
| 2011/0043852 A1* | 2/2011 | Uejo | G06F 3/1222 358/1.15 |
| 2018/0039787 A1 | 2/2018 | Watariuchi | |
| 2018/0063352 A1 | 3/2018 | Yasuhara et al. | |

FOREIGN PATENT DOCUMENTS

JP          4819311 B     11/2011

* cited by examiner

*Primary Examiner* — Douglas Q Tran
(74) *Attorney, Agent, or Firm* — Venable LLP

(57) ABSTRACT

According to the present invention, there is provided an image forming apparatus that has a scan function. The image forming apparatus comprises a restriction converter for converting, in a case in which a file upload and a file restriction are designated in a web content received from a web server, the file restriction into a scan function restriction, a scan cooperation unit for calling, in accordance with a file input instruction made by a user for the designation of the file upload, the scan function with the restriction converted by the restriction conversion unit, and a transmitter for transmitting a file generated by the scan function called by the scan cooperation unit to the web server.

12 Claims, 20 Drawing Sheets

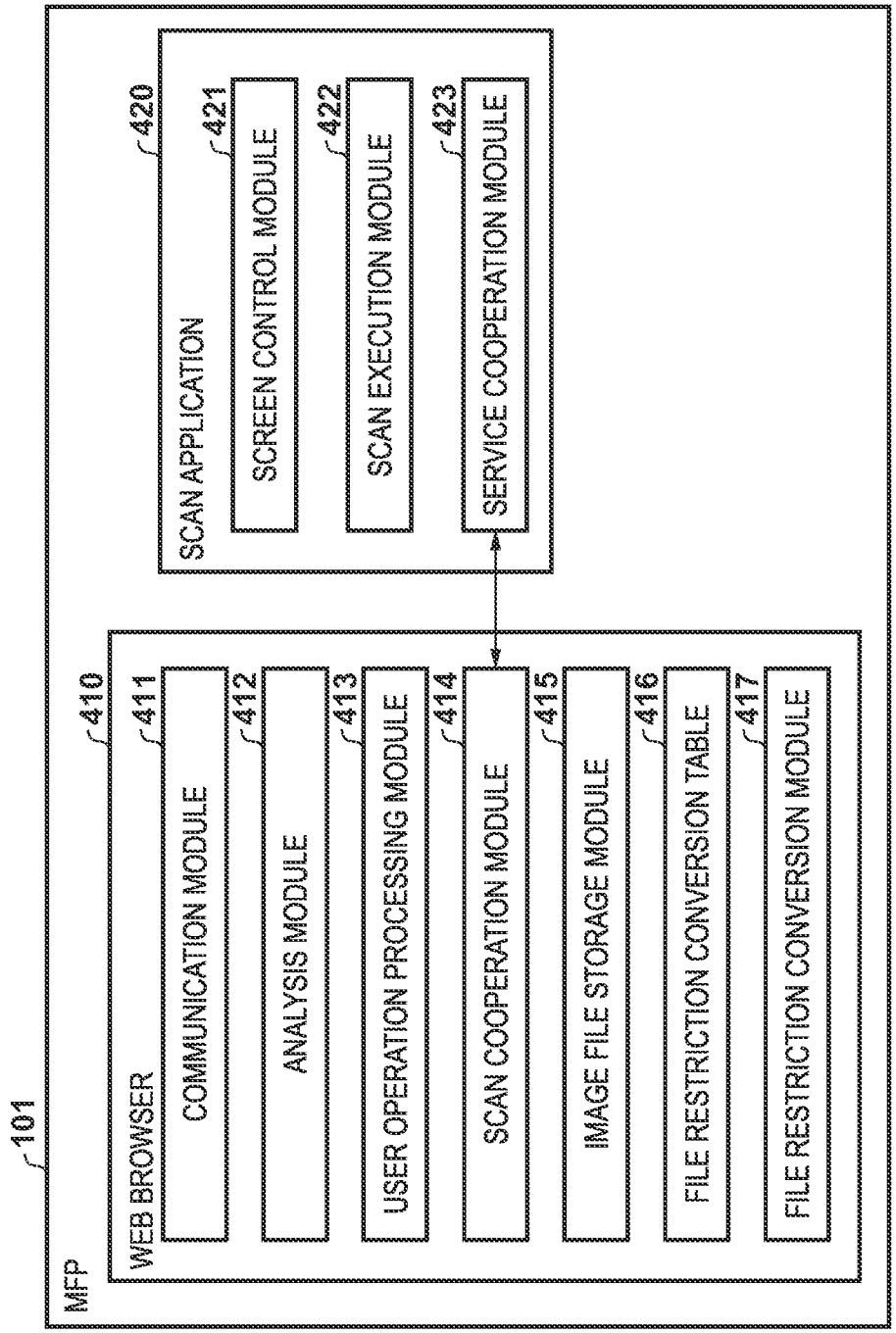

```
<html>
  <head>
    <title>WebApp</title>
  </head>
  <body>
    Welcome to WebApp.
    <form method="post">
      <input type="file" accept="image/jpeg, application/pdf">     ← 501
      <br>
      <input type="submit" value="UPLOAD">     ← 502
    </form>
  </body>
</html>
```

FIG. 7A

700  
SCAN FUNCTION TABLE

| ID | ATTRIBUTE | RANGE |
|---|---|---|
| A711 | FILE_TYPE | = PDF |
| A712 | FILE_TYPE | = JPEG |
| A713 | FILE_TYPE | = TIFF |
| A714 | FILE_TYPE | = PNG |
| A715 | FILE_TYPE | = JPEG\|TIFF\|PNG |
| A716 | FILE_TYPE | = PDF\|DOCX\|PPTX |
| A717 | TWO_SIDED | = true |
| A718 | SPLIT_PAGE | = true |
| A719 | SCAN_PAGE | >1 |
| ... | ... | ... |

FIG. 7B

720  
FILE RESTRICTION TABLE

| ID | ATTRIBUTE | ATTRIBUTE VALUE | INDIVIDUAL FUNCTION RESTRICTION | COMBINED RESTRICTION |
|---|---|---|---|---|
| B731 | accept | "application/pdf" | A711 | – |
| B732 | accept | "image/jpeg" | A712 | – |
| B733 | accept | "image/*" | A712,A713,A714 | – |
| B734 | multiple | undefined | – | [A715, A717], [A715, A719], [A716, A718], ... |
| ... | ... | ... | ... | ... |

FIG. 11

```
1101 ─ site: "http://server1/webapp1",
1102 ─ file_restrictions:{
           accept: ["image/png"]
       },
1103 ─ scan_restrictions:{
           resolution: ["100x100", "200x200"],
           color: ["mono"]
       },
       set_cookie_mode: 0,
       rest_url_entry: 1,
       ...
```

FIG. 14A

```
1101 ── site: "http://server1/webapp1",
1102 ── file_restrictions:{
            accept: ["image/png"]
        },
1103 ── scan_restrictions:{
            resolution: ["100x100", "200x200"],
            color: ["mono"]
        },
1401 ── scan_functions: {
            multicrop: true
        }
        set_cookie_mode: 0,
        rest_url_entry: 1,
        ...
```

FIG. 14B

```
1101 ── site: "http://server1/webapp1",
1102 ── file_restrictions:{
            accept: ["image/png"]
        },
1103 ── scan_restrictions:{
            resolution: ["100x100", "200x200"],
            color: ["mono"]
        },
1402 ── scan_functions: {
            ocr: ["en", "ja"]
        }
        set_cookie_mode: 0,
        rest_url_entry: 1,
        ...
```

FIG. 15

1332
SERVICE MANAGEMENT TABLE

| 1501<br>ID | 1502<br>TYPE | 1503<br>ENABLED FUNCTION | 1504<br>PRIORITY | 1505<br>APPLICATION ID |
|---|---|---|---|---|
| C1511 | SCAN | color: ["color", "mono"],<br>resolution: ["100x100", "200x200", ...],<br>... | 1 | DEFAULT_SCAN_APP |
| C1512 | SCAN | color: ["color", "mono"],<br>resolution: ["100x100", "200x200", ...],<br>ocr: ["en", "ja", "fr", "it", "de"],<br>... | 2 | EXT_SCAN_APP_A |
| C1513 | SCAN | color: ["color", "mono"],<br>resolution: ["100x100", "200x200", ...],<br>ocr: ["en", "ja", "de"],<br>multicrop: true,<br>... | 3 | EXT_SCAN_APP_B |
| ... | PRINT | ... | ... | |
| ... | SEND | ... | ... | |
| ... | COPY | ... | ... | |

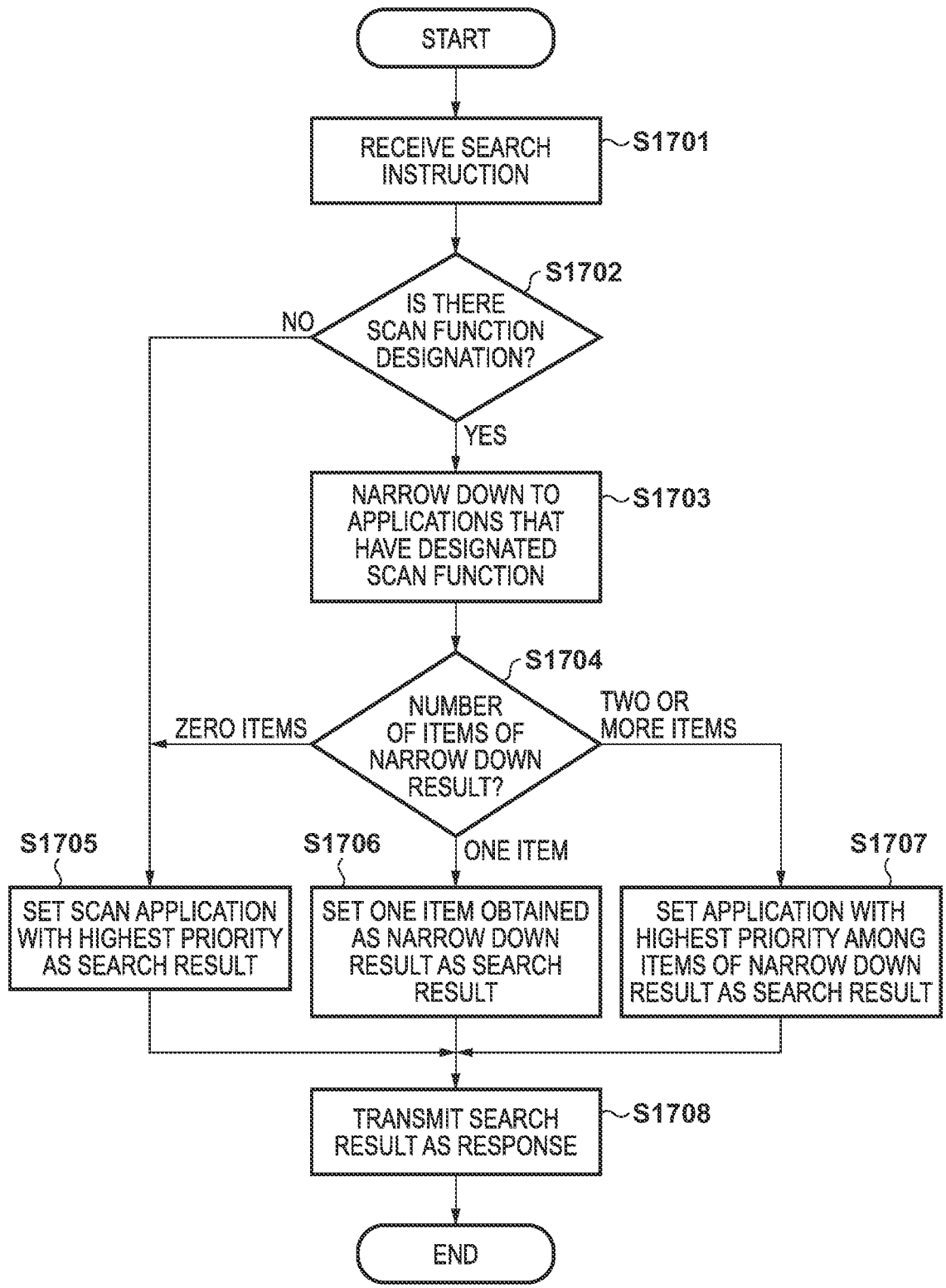

IMAGE FORMING APPARATUS THAT CONVERTS A FILE RESTRICTION INTO A SCAN FUNCTION RESTRICTION, METHOD OF CONTROLLING THE SAME AND COMPUTER-READABLE STORAGE MEDIUM

BACKGROUND OF THE INVENTION

Field of the Invention

The present invention relates to an image forming apparatus, a method of controlling the same and a computer-readable storage medium, and more particularly to an image forming apparatus that is connected to a web server and includes a web browser configured to display an operation screen provided by the web server and a method of controlling such an image forming apparatus.

Description of the Related Art

An information processing apparatus such as a PC can be connected to a web server on a network, and an operation screen provided by a website on the web server can be displayed on a web browser included in the information processing apparatus. In this case, first, the web browser of the information processing apparatus will make a request to the web server for the operation screen. The web server will respond to the request from the information processing apparatus by transmitting, as a response, an HTML document for displaying the operation screen on the web browser to the information processing apparatus. The web browser of the information processing apparatus analyzes the received HTML document and displays the operation screen based on the description of the HTML document. For example, a text input form for inputting arbitrary characters and a file upload form for uploading a file present in the information processing apparatus are displayed.

In recent years, among image forming apparatuses called MFPs (Multi-Function Peripherals) that include a scanner and a printer, there is an image forming apparatus that includes a web browser such as that described above. As the web browser included in the image forming apparatus, there is a browser that performs file upload processing by uploading a newly scanned image instead of uploading a file already stored in the image forming apparatus (for example, see Japanese Patent No. 4819311).

A description restricting a file to be uploaded can be written in an HTML document. However, in order to upload a scanned image in an image forming apparatus, the scanned image needs to be converted so as to satisfy the file restriction designated in the HTML document. This process can be troublesome.

Furthermore, depending on the scan settings, there may be a case in which the image cannot be converted so that it will satisfy the file restriction designated in the HTML document. Such a case will require the scanning to be performed again by changing the settings, and this reduces user convenience and productivity.

SUMMARY OF THE INVENTION

The present invention provides an image forming apparatus that can upload a file by executing a scan under a setting which satisfies a file restriction designated by a server, and a method of controlling the image forming apparatus.

The present invention includes the following arrangements. That is, according to an aspect of the present invention, there is provided an image forming apparatus that has a scan function, comprising: a restriction converter configured to convert, in a case in which a file upload and a file restriction are designated in a web content received from a web server, the file restriction into a scan function restriction; a scan cooperation unit configured to call, in accordance with a file input instruction made by a user for the designation of the file upload, the scan function with the restriction converted by the restriction converter; and a transmitter configured to transmit a file generated by the scan function called by the scan cooperation unit to the web server.

According to another aspect of the present invention, there is provided a method of controlling an image forming apparatus that has a scan function, the method comprising: converting, in a case in which a file upload and a file restriction are designated in a web content received from a web server, the file restriction into a scan function restriction; calling, in accordance with a file input instruction made by a user for the designation of the file upload, the scan function with the converted restriction; and transmitting a file generated by the called scan function to the web server.

According to still another aspect of the present invention, there is provided a non-transitory computer-readable storage medium storing a program for causing a computer that has a scan function to convert, in a case in which a file upload and a file restriction are designated in a web content received from a web server, the file restriction into a scan function restriction; call, in accordance with a file input instruction made by a user for the designation of the file upload, the scan function with the converted restriction; and transmit a file generated by the called scan function to the web server.

According to the present invention, a file can be uploaded by executing a scan under a setting which satisfies a file restriction designated by a server.

Further features of the present invention will become apparent from the following description of exemplary embodiments with reference to the attached drawings.

BRIEF DESCRIPTION OF THE DRAWINGS

FIG. 4 is a block diagram showing the software arrangement of the MFP according to the first embodiment;

FIG. 7A shows an example of a file restriction conversion table according to the first embodiment;

FIG. 7B shows an example of another file restriction conversion table according to the first embodiment;

FIG. 11 shows an example of a description of SSB settings according to the second embodiment;

FIGS. 12A-1, 12A-2 and 12B are flowcharts showing an example of web browser processing according to the second embodiment;

FIG. 14A shows an example of a description of SSB settings according to the third embodiment;

FIG. 14B shows an example of another description of SSB settings according to the third embodiment;

FIG. 15 shows an example of a description of a service management table according to the third embodiment;

FIGS. 16A-1, 16A-2 and 16B are flowcharts showing an example of web browser processing according to the third embodiment; and FIG. 17 is a flowchart showing an example of processing performed in a service management module according to the third embodiment.

DESCRIPTION OF THE EMBODIMENTS

The best mode for carrying out the present invention will now be described with reference to the accompanying drawings.

First Embodiment

Figure 1:
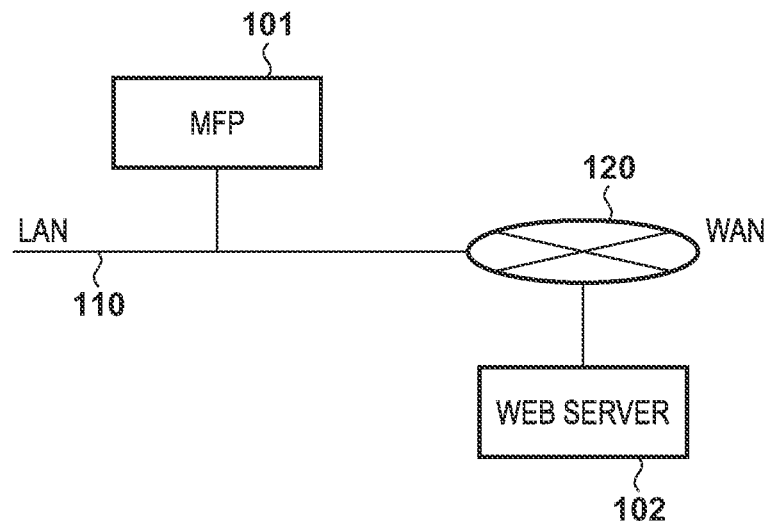
FIG. 1 is a view showing the arrangement of an image processing system according to the first embodiment.

FIG. 1 is a view showing an example of the system arrangement of an information processing system according to an embodiment. This system is formed by an MFP 101 which is connected via a LAN 110 and a web server 102 which is connected via a WAN 120. An apparatus on the LAN 110 and an apparatus on the WAN 120 can communicate with each other via their respective networks. FIG. 1 shows an example of a typical network arrangement, and the apparatuses may be arranged on either the LAN 110 or the WAN 120.

The MFP 101 is an image forming apparatus that includes a scanner and a web browser. The web server 102 is connected to the MFP 101 via a network, has a function of distributing a web content via the network, and provides the web content in response to a request from the web browser of the MFP 101.

Hardware Arrangement

Figure 2:
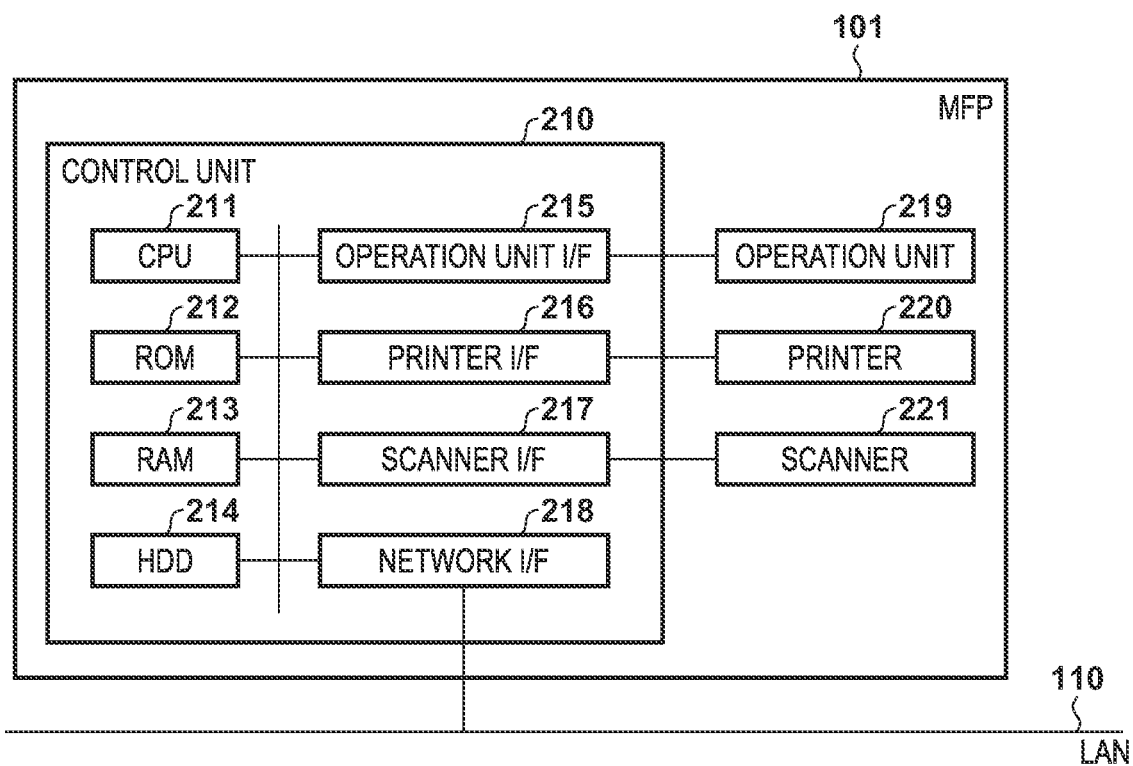
FIG. 2 is a block diagram showing the hardware arrangement of an MFP according to the first embodiment.

FIG. 2 is a block diagram showing an example of the arrangement of the MFP 101 according to the embodiment. A control unit 210 that includes a CPU 211 controls the overall operation of the MFP 101. The CPU 211 executes various kinds of control processing such as read control and transmission control by reading out control programs stored in a ROM 212 and an HDD 214. A RAM 213 is used as a main memory of the CPU 211 and a temporary storage area such as a work area. The HDD 214 stores various kinds of programs and image data read by a scanner 221.

An operation unit I/F 215 connects the control unit 210 to an operation unit 219. The operation unit 219 includes a keyboard and a liquid crystal display unit that has a touch panel function.

A printer I/F 216 connects the control unit 210 to a printer 220. Image data to be printed by the printer 220 is transferred from the control unit 210 to the printer 220 via the printer I/F 216 and is printed on a print medium by the printer 220.

A scanner I/F 217 connects the control unit 210 to the scanner 221. The scanner 221 generates image data by reading an image on an original and inputs the image data to the control unit 210 via the scanner I/F 217. A network I/F 218 connects the control unit 210 (MFP 101) to the LAN 110. The network I/F 218 exchanges various pieces of information with another apparatus on the LAN 110 or the WAN 120.

Figure 3:
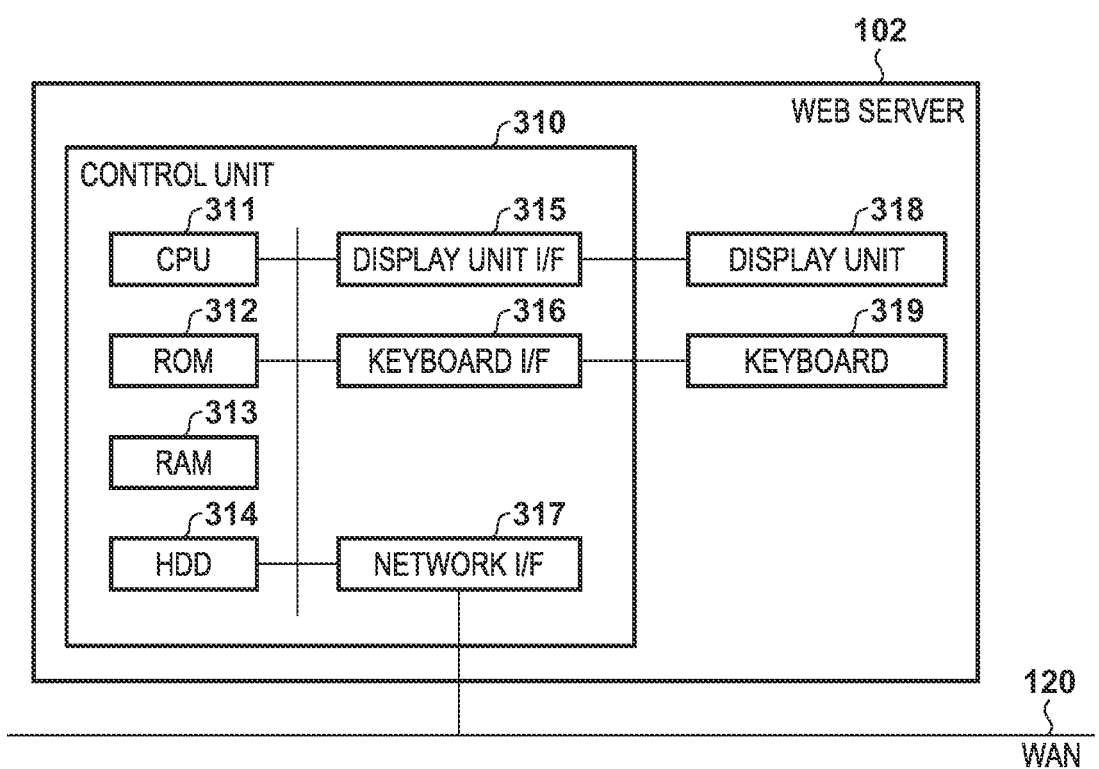
FIG. 3 is a block diagram showing the hardware arrangement of a web server according to the first embodiment.

FIG. 3 is a block diagram showing an example of the arrangement of the web server 102 according to the embodiment. A control unit 310 that includes a CPU 311 controls the overall operation of the web server 102. The CPU 311 executes various kinds of control processing by reading out control programs stored in a ROM 312 and an HDD 314. A RAM 313 is used as a main memory of the CPU 311 and a temporary storage area such as a work area. The HDD 314 stores various kinds of programs and data.

A display unit I/F 315 connects the control unit 310 to a display unit 318. A keyboard I/F 316 connects the control unit 310 to a keyboard 319. The CPU 311 recognizes an instruction made by a user via the keyboard 319 and shifts the screen displayed on the display unit 318 in accordance with the recognized instruction. Note that since some web servers are remotely managed, there can be an arrangement in which the display unit 318 and the keyboard 319 are not included depending on the web server.

A network I/F 317 connects the control unit 310 (web server 102) to the WAN 120. The network I/F 317 exchanges various pieces of information with another apparatus on the LAN 110 or the WAN 120.

Software Arrangement of the MFP 101

FIG. 4 is a block diagram for explaining the software arrangement of the MFP 101 according to this embodiment. The following processing is executed by the CPU 211 reading out each program (software) stored in the HDD 214 of the MFP 101 to the RAM 213 and analyzing and executing the program.

The MFP 101 includes a web browser 410 and a scan application 420. The web browser 410 obtains a web content by communicating with an arbitrary web server and displays the obtained content on a screen. The web browser 410 includes a communication module 411, an analysis module 412, a user operation processing module 413, a scan cooperation module 414, an image file storage module 415, file restriction conversion tables 416, and a file restriction conversion module 417.

The communication module 411 communicates with the web server 102 in accordance with the HTTP protocol. More specifically, the communication module 411 transmits a request to the web server 102 and receives a web content as a response.

The analysis module 412 analyzes the response received from the web server 102 and renders an operation screen. The rendering result is then displayed on the operation unit 219. An HTML document which is a description showing the contents of the operation screen to be displayed on the web browser 410 and Java Script® which is to be applied to the operation screen are described in the response.

The user operation processing module 413 executes processing performed when the user operates the web content displayed on the operation unit 219. For example, the user operation processing module transmits the contents of a form as an HTTP request when a submit button is pressed by the user, and prepares to call the scan application 420 when the user presses a button corresponding to a file upload form.

The scan cooperation module 414 cooperates with the scan application 420. More specifically, the scan cooperation module can call the scan application 420, receive an image file from the scan application 420, and store the image file in the image file storage module 415. The image file storage module 415 is an area for storing an image file generated by the scan application 420.

The file restriction conversion tables 416 are a table for converting a file restriction designated in the HTML document into a scan function restriction. The file restriction conversion module 417 converts the file restriction designated in the HTML document into a scan function restriction by using the file restriction conversion tables 416.

The scan application 420 has a scan function to read an original from the scanner 221. In addition, the scan application 420 has a function (to be referred to as a service cooperation function hereinafter) of providing a scan function by receiving a call from another software module. The scan application 420 includes a screen control module 421, a scan execution module 422, and a service cooperation module 423.

The screen control module 421 controls a screen related to the scan function. More specifically, the screen control module displays a scan setting screen and executes processing upon accepting a user operation on the scan setting screen. The scan execution module 422 reads an original from the scanner 221 and generates an image file.

The service cooperation module 423 executes cooperative processing when the scan application 420 is called by another software module. More specifically, the service cooperation module receives a call parameter from the software module which is the caller and transfers an image file generated by the scan execution module 422 to the software module which is the caller.

Note that although this embodiment has an arrangement in which the web browser 410 includes the file restriction conversion tables 416 and the file restriction conversion module 417, the present invention is not limited to this. It may have an arrangement in which the file restriction conversion tables 416 and the file restriction conversion module 417 are held by the scan application 420 or by another software module (not shown).

Figures 5A, 5B:
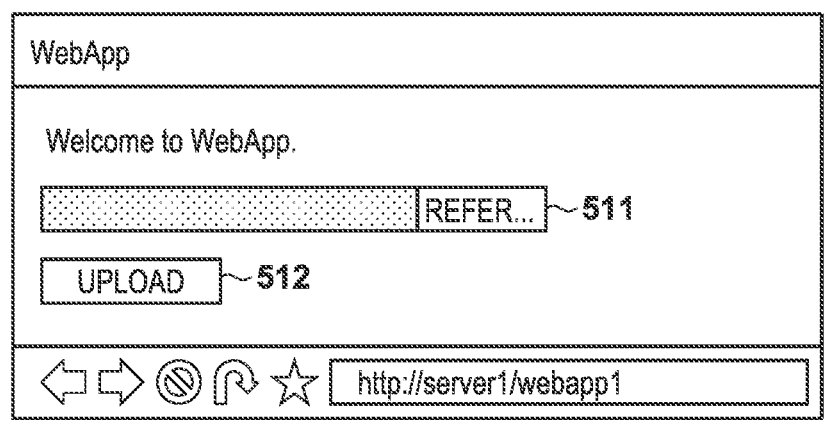
FIG. 5A shows an example of an HTML document according to the first embodiment.
FIG. 5B shows an example in which the HTML document is displayed on a screen by a web browser 410 according to the first embodiment.

FIG. 5A is a view showing an example of an HTML document according to the embodiment, and FIG. 5B is view showing an example of this HTML document displayed on the web browser 410.

FIG. 5A is an example of an HTML document received by the web browser 410 from the web server 102. A file upload form 501 (<input type="file">) and a submit button 502 (<input type="submit">) constituted by input elements are included in FIG. 5A.

An accept attribute of the file upload form 501 is an attribute designating the type of a file that can be received by the web server 102. A value can be designated by a MIME type or an extension, and a plurality of values can be arranged by using commas as delimiters. FIG. 5A shows that the web server can receive a JPEG file or a PDF file.

Also, it is defined in the HTML protocol that an input element holds a multiple attribute. The multiple attribute is an attribute designating whether the web server 102 can receive a plurality of files. The multiple attribute is a Boolean attribute that has meaning by whether an attribute is present or not without designating a value, and a form is determined to be "true" if this attribute has been designated or to be "false" if this attribute has not been designated. Since the multiple attribute is not designated in the file upload form 501, the form is determined to be "false". That is, it has been designated in the file upload form 501 that the web server 102 cannot receive a plurality of files (that is, can receive only a single file).

FIG. 5B is an example of a display screen when the HTML document of FIG. 5A is displayed on the web browser 410. A button 511 is a button corresponding to the file upload form 501. Although the caption of the button 511 in FIG. 5B is "refer . . . ", it may be displayed as "scan . . . " A button 512 is a button corresponding to the submit button 502. A value "upload" designated by the input form of the submit button is displayed on the submit button 502.

Uploading Sequence of Scanned Image Data File

Figure 6:
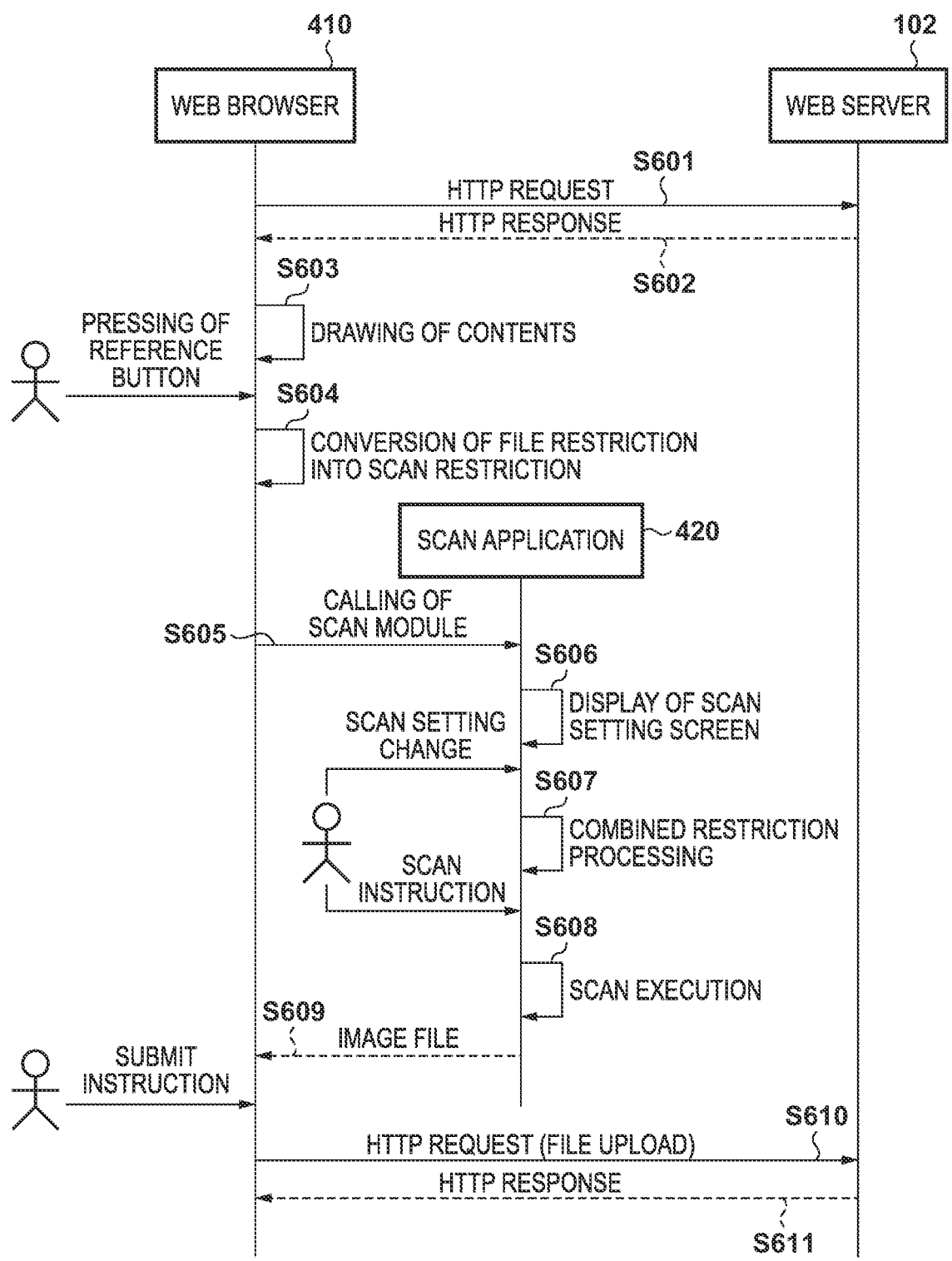
FIG. 6 is a sequence chart showing an example of processing of the MFP according to the first embodiment.

FIG. 6 is a sequence chart showing a sequence in which an original is scanned and an image is uploaded as file upload form processing of the web browser 410.

In S601, the web browser 410 transmits an HTTP request to the web server 102. The web server 102 as the transmission destination may be designated by, for example, the web browser 410 or may be registered in association with a button or the like in advance.

In S602, the web browser 410 receives a web content as an HTTP response from the web server 102. In the following description, assume that the web content received at this time is the HTML document shown in FIG. 5A.

In S603, the web browser 410 analyzes the received web content and displays the rendering result (for example, the screen shown in FIG. 5B) on the operation unit 219.

In S604, upon detecting that the user has pressed a reference button 511, the web browser 410 converts the file restriction designated in the HTML document into a scan function restriction by using the file restriction conversion tables 416. The scan function restriction has two types of restrictions, an "individual function restriction" which places a restriction on a range of an individual function or the function itself and a "combined restriction" which places a restriction on a combination of functions. The individual function restriction and the combined restriction will be generically called and defined as "scan restrictions".

In S605, the web browser 410 calls the scan application 420. At this time, the web browser 410 calls the scan restriction obtained in S604 and transfers it as a parameter to the scan application 420.

In S606, the scan application 420 which was called by the web browser 410 displays the scan setting screen. At this time, the scan application 420 will display the function-restricted scan screen in accordance with the call parameter received from the web browser 410.

In S607, upon receiving the scan setting changes made by the user, the scan application 420 executes combined restriction processing in accordance with the call parameter received from the web browser 410. For example, the scan application limits or disables the setting range of another setting which is restricted in the combination with the setting values changed by the user. The user can repeatedly change the scan settings, and the process of S607 is repeatedly executed each time the settings are changed.

In S608, upon receiving a scan execution instruction from the user, the scan application 420 generates an image file by reading an original from the scanner 221 in accordance the scan settings.

In S609, the scan application 420 transfers the image file generated in S608 to the web browser 410.

In S610, upon detecting that the user has pressed the button 511, the web browser 410 transmits an HTTP request to the web server 102. At this time, the HTTP request includes form data, that is, the image file received from the scan application 420 in S609.

In S611, the web browser 410 receives an HTTP response to the HTTP request of S601 from the web server 102.

Example of File Restriction Conversion Table

FIGS. 7A and 7B are tables showing examples of the file restriction conversion tables 416 according to this embodiment. The file restriction conversion tables 416 can be prepared in advance in correspondence with possible scan settings. The file restriction conversion tables 416 are formed from two tables, a scan function table 700 shown in FIG. 7A and a file restriction table 720 shown in FIG. 7B. The scan function table 700 shown in FIG. 7A is a table defining ranges of scan functions. The file restriction table 720 shown in FIG. 7B is a table for specifying a scan function corresponding to an input element attribute. The applicability of the individual function restriction or the combined restriction is determined by using the two tables, the scan function table 700 and the file restriction table 720, in combination.

The scan function table 700 shown in FIG. 7A is formed from a column of an ID 701, a column of a function 702, and a column of a range 703. The column of the ID 701 is a column defining identifiers for specifying the respective rows of the table. Note that the values shown in the column of the ID 701 will be used to designate the rows of the table in the following description. For example, a row whose value in the column of the ID 701 is "A711" will be described as "a row A711". The column of the function 702 and the column of the range 703 are columns defining the scan functions and the ranges of the functions, respectively.

The file restriction table 720 shown in FIG. 7B is formed from a column of an ID 721, a column of an attribute 722, a column of an attribute value 723, a column of an individual function restriction 724, and a column of a combined restriction 725.

The column of the ID 721 is a column defining identifiers for specifying the respective rows of the table. Note that values shown in the column of the ID 721 will be used to designate the rows of the table in the following description. For example, a row whose value in the column of the ID 721 is "B731" will be described as "a row B731".

The column of the attribute 722 and the column of the attribute value 723 are columns defining the input element attributes and the values of the attributes, respectively. Note that "undefined" shown in the column of the attribute value 723 is a value indicating that the corresponding attribute defined in the column of the attribute 722 is not designated as an input element attribute.

The column of the individual function restriction 724 is a column defining a scan function to be restricted when a matching attribute is designated in the column of the attribute 722 and the column of the attribute value 723. Each value shown in the column of the individual function restriction 724 is an identifier defined in the column of the ID 701 in the scan function table 700 shown in FIG. 7A, and is capable of specifying a row in the scan function table 700 by using the value of the column of the individual function restriction 724 as a key. The more specific values of the scan function to be restricted and its corresponding range are determined by referring to the scan function table 700. For example, in a case in which "application/pdf" is the accept attribute of the input element in the row B731, it is defined that the range of FILE_Type (the file format of a scanned image) defined in the row A711 will be restricted to "PDF". Note that in the examples shown in FIGS. 7A and 7B, a composite range shown in the column of the range 703 represents that the range is one of the individual ranges. For example, the range of the function FILE_TYPE whose ID is A715 is a composite range of ranges JPEG|TIFF|PNG, and this indicates that the range of the function FILE_TYPE is one of JPEG, TIFF, and PNG.

The column of the combined restriction 725 is a column defining the combination of the scan settings to be restricted when a matching attribute is defined in the attribute 722 and the attribute value 723 in the input element of the HTML document. The values shown in the combined restriction 725 are identifiers defined in the ID 701 in the scan function table 700 of FIG. 7A, and define the restricted combinations of functions by the combination of the identifiers. It is possible to determine the more specific values of the scan functions that have been restricted from being combined by referring to the scan function table 700. For example, a plurality of combinations of functions, which are restricted when "multiple" is not designated in the accept attribute of the input element, are defined in a row B734. For example, [A715, A717] is a definition indicating that the combination of the functions designated in a row A715 and a row A717 in the scan function table 700 is a combination of functions that cannot be simultaneously enabled. Note that in a case in which the ID 701 in the scan function table defined in the combined function restriction is an ID of a row defining a composite range, each value included in the composite range will be a restriction target. For example, if "A715" is the ID 701, it is shown in its range that FILE_TYPE is one of JPEG, TIFF, and PNG. That is, the restriction described in the row B734 indicates that when FILE_TYPE is "JPEG", "TIFF", or "PNG" (definition in the row A715), TWO_SIDED cannot be set to "true" (definition in the row A717). In other words, [A715, A717] can be divided into three combinations and described as [A712, A717], [A713, A717], and [A714, A717]. The row A715 and a row A716 are not required when the combinations are to be described in this manner.

When the HTTP response is received in S602, a search is executed in the file restriction table 720 by using the attribute and the attribute value included in the response, and the scan function and its range associated with the corresponding column of the individual function restriction 724 are set as the scan settings. The scan settings will also be restricted so it will not have the combination of settings shown in the corresponding column of the combined restriction 725.

File Upload Processing Procedure by Web Browser

Figure 8:
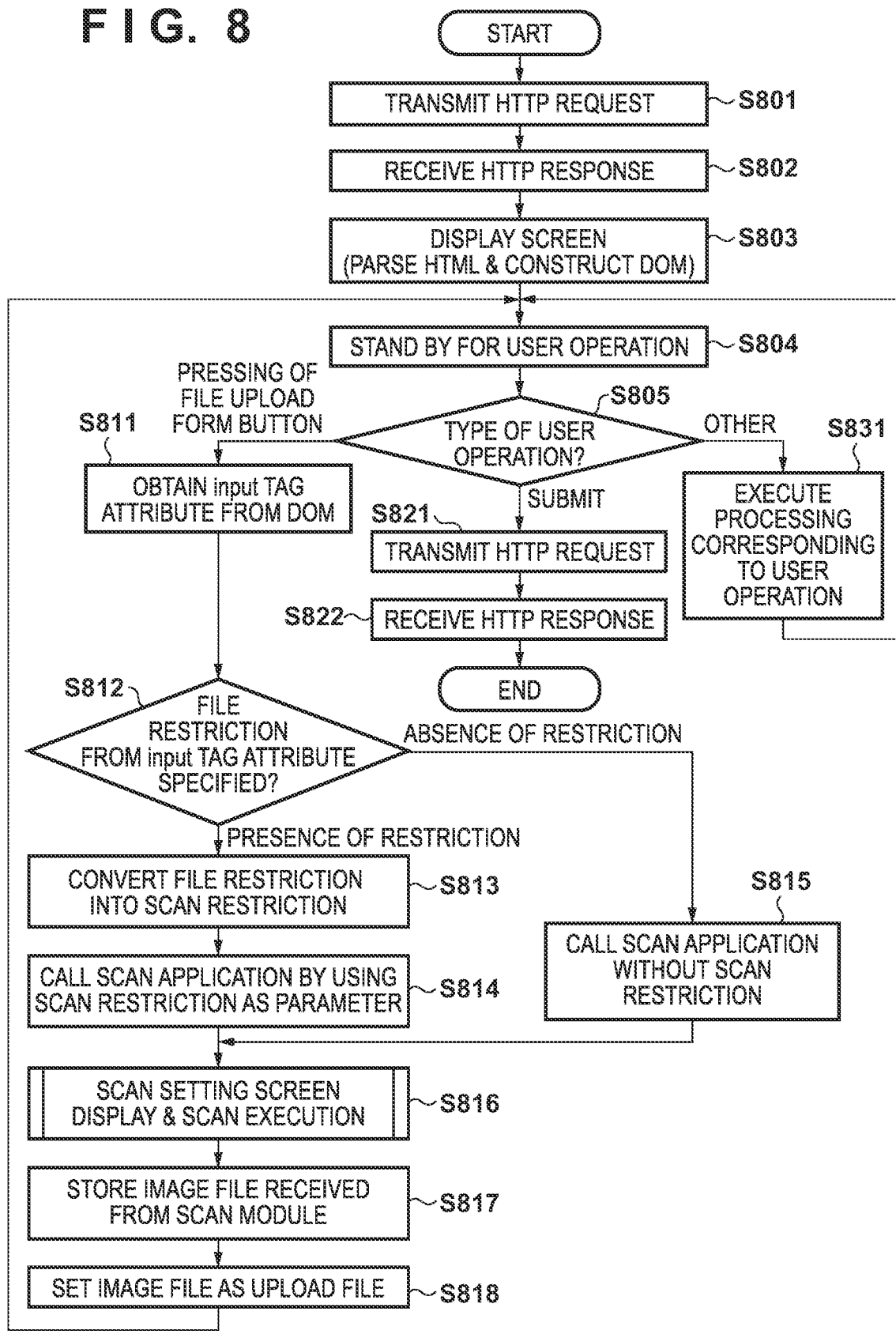
FIG. 8 is a flowchart showing an example of web browser processing according to the first embodiment.

FIG. 8 is a flowchart defining the processing performed by the web browser 410 shown in the sequence chart of FIG. 6. Each step of the flowchart of FIG. 8 is executed by the CPU 211 reading out a program stored in the HDD 214 of the MFP 101 to the RAM 213 and analyzing and executing the program.

In step S801, the communication module 411 transmits an HTTP request to the web server 102.

In step S802, the communication module 411 receives a web content as an HTTP response from the web server 102. Assume that the web content received at this time is the HTML document shown in FIG. 5A in the following description.

In step S803, the analysis module 412 analyzes the received web content and renders an operation screen. The rendering result is displayed on the operation unit 219 (see FIG. 5B). The analysis module 412 simultaneously holds the analyzed content as a DOM (Document Object Model) in the RAM 213. A DOM is data obtained by modeling the elements and the respective attributes described in the HTML document as a hierarchical structure of objects.

In step S804, the user operation processing module 413 stands by for a user operation. The user operation processing module 413 causes the process to advance to the next step when it detects a user operation.

In step S805, the user operation processing module 413 determines the type of the detected user operation. If the type of the user operation is the pressing of a file upload form button (button 511), that is, if the user has made a file input instruction related to a file upload designation, the user operation processing module 413 will advance the process to step S811. If the type of the user operation is a form submit instruction (for example, pressing of the button 512), the user operation processing module 413 will advance the process to step S821. If the type of the user operation is other than those described above, the user operation processing module 413 will advance the process to step S831, execute processing corresponding to the user operation, and subsequently return the process to step S804 to stand by for the next user operation.

In step S811, the user operation processing module 413 will obtain an attribute defined in the upload form (<input type="file">) corresponding to the button pressed by the user from the DOM held by the analysis module 412.

In step S812, the file restriction conversion module 417 specifies the file restriction from the attribute obtained in step S811 and determines whether there is a file restriction. The file restriction conversion module 417 advances the process to step S813 if there is a file restriction. Otherwise, the file restriction conversion module advances the process to step S815. More specifically, the file restriction conversion module 417 compares the attribute obtained in step S811 with those of the column of the attribute 722 and the column of the attribute value 723 of the file restriction table 720, and extracts a matching row from the file restriction table 720. For example, in the case of the file upload form 501 shown in FIG. 5A, the row B731, a row B732, and the row B734 will be the extraction result. The breakdown of this is as follows. The designation "accept="image/jpeg, application/pdf"" matches the rows B731 and B732. The row B734 also matches since the multiple attribute is not designated in the file upload form 501.

In step S813, the file restriction conversion module 417 converts the specified file restriction into a scan restriction. More specifically, each corresponding row in the scan function table 700 is specified by linking the respective values of the column of the individual function restriction 724 and the column of the combined restriction 725 with the column of the ID 701 in the scan function table 700. For example, in the case of the row B731, the value in the column of the individual function restriction 724 is "A711" and corresponds to the row A711 in the scan function table 700. It can be understood from the definition described in the row A711 that the range of FILE_TYPE (the file format of the scanned image) is restricted to "PDF". In the same manner, in the case of the row B732, it can be understood that the range of FILE_TYPE is restricted to "JPEG" by referring to the row A712 in the scan function table 700. In the case of the file upload form 501, since the definitions of both the row A711 and the row A712 specified from the row B731 and the row B732 are enabled, the range of FILE_TYPE will be "PDF and JPEG". In addition, combinations of scan settings to be restricted are defined in the column of the combined restriction 725 in the row B734. For example, [A715, A717] is a definition indicating that the combination of functions designated in the row A715 and the row A717 in the scan function table 700 is a combination of functions that cannot be simultaneously enabled. That is, when FILE_TYPE is "JPEG", "TIFF", or "PNG" (definition in the row A715), TWO_SIDED cannot be set to "true" (definition in the row A717). In the same manner, a restriction will be placed on other combinations such as [A715, A719], [A716, A718], and the like defined in the combined restriction 725. That is, when FILE_TYPE is "JPEG", "TIFF", or "PNG" (definition in the row A715), SCAN_PAGE cannot be ">1" (definition in a row A719). Also, when FILE_TYPE is "PDF", "DOCX", or "PPTX" (definition in the row A716), SPLIT_PAGE cannot be set to "true" (definition in a row A718).

In step S814, the scan cooperation module 414 calls the scan application 420. At this time, the scan cooperation module 414 transmits each scan restriction specified in step S812 as a call parameter to the scan application 420.

On the other hand, the process of step S815 is a process performed when it is determined that there is no designation of file restriction in step S812. The scan cooperation module 414 will call the scan application 420 without including a scan restriction in the call parameter.

Step S816 is process in which the scan application 420 displays the scan setting screen and executes a scan. This process will be described in detail later with reference to the flowchart of FIG. 9.

In step S817, the scan cooperation module 414 receives the image file generated by the scan application 420 in step S816 and stores the received image file in the image file storage module 415.

In step S818, the scan cooperation module 414 sets the image file stored in step S817 as a file-upload-form target file. Subsequently, the process returns to step S804 and stands by for the next user operation.

In step S821, upon receiving a submit instruction as the user operation, the user operation processing module 413 transmits an HTTP request to the web server 102 via the communication module 411. At this time, the image file set as the file-upload-form target file in step S818 is included as form data in the HTTP request.

In step S822, the communication module 411 receives an HTTP response to the HTTP request of step S821 from the web server 102 and ends the processing.

Scan Processing

Figure 9:
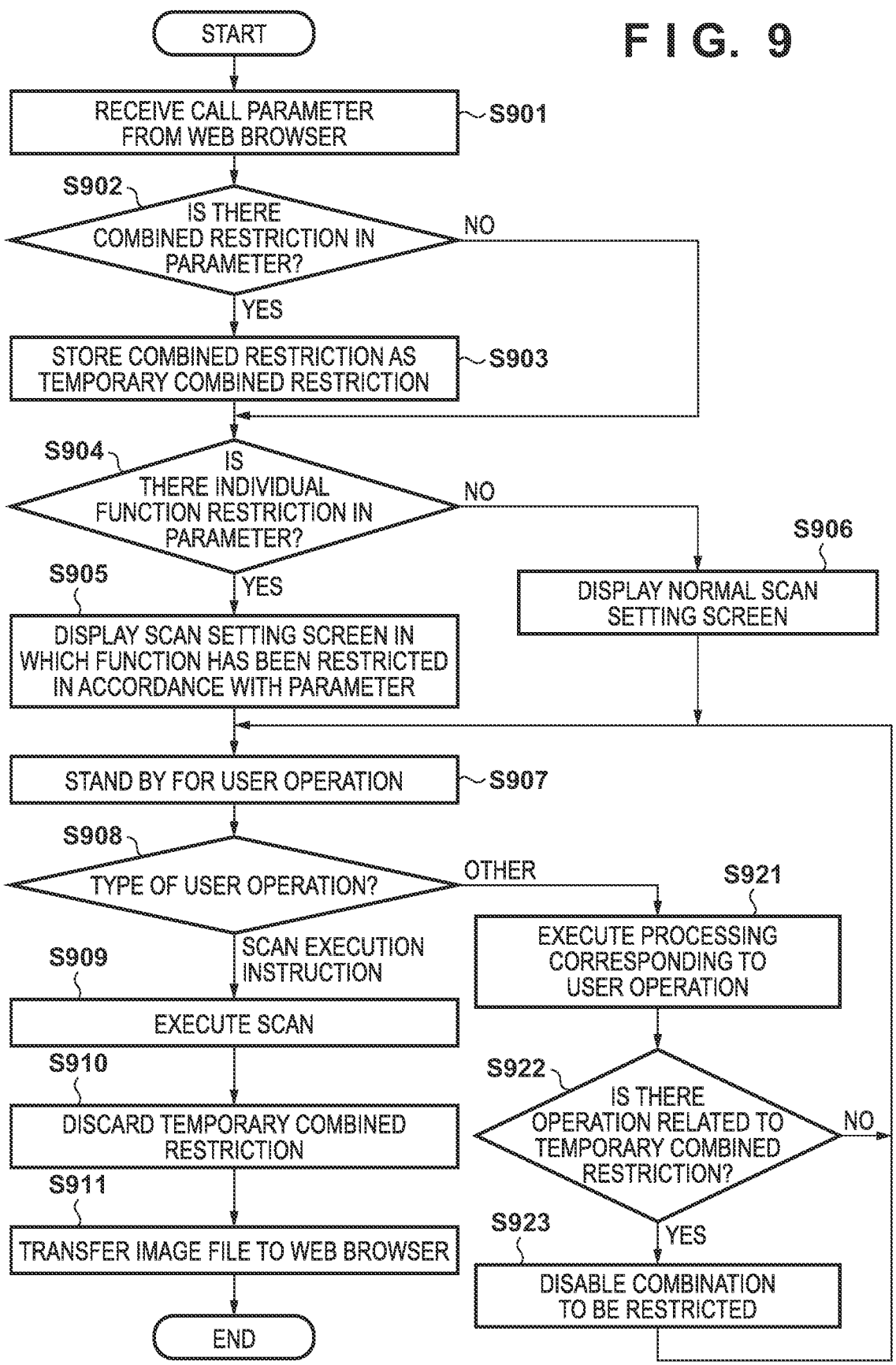
FIG. 9 is a flowchart showing an example of scan application processing according to the first embodiment.

FIG. 9 is a flowchart defining the processing performed by the scan application 420 that is called by the web browser 410 in step S816 of FIG. 8. Each step of the flowchart shown in FIG. 9 is executed by the CPU 211 reading out a program stored in the HDD 214 of the MFP 101 to the RAM 213 and analyzing and executing the program.

In step S901, the service cooperation module 423 that has been called by the web browser 410 receives a call parameter from the web browser 410.

In step S902, the service cooperation module 423 determines whether there is a combined restriction included in the parameter received in step S901. If the parameter includes the combined parameter, the service cooperation module 423 will advance the process to step S903. Otherwise, the service cooperation module will advance the process to step S904.

In step S903, the service cooperation module 423 stores combined restriction included in the parameter received in step S901 as a temporary combined restriction. A temporary combined restriction is a combined restriction that is enabled only for a period in which a series of processing related to the call received from the web browser 410 in step S901 is performed (that is, only for a temporary period until the processing of this flowchart is completed).

In step S904, the service cooperation module 423 determines whether an individual function restriction is included in the parameter received in step S901. If the parameter includes the individual function restriction, the service cooperation module 423 advances the process to step S905. Otherwise, the service cooperation module will advance the process to step S906.

In step S905, the screen control module 421 will cause the operation unit 219 to display a scan setting screen formed in accordance with the individual function restriction designation included in the parameter received in step S901. For example, in the case of the HTML document shown in FIG. 5A, the range of FILE_TYPE is restricted to "PDF and JPEG" as the individual function restriction as described in steps S812 and S813 of FIG. 8. Hence, in step S905, the screen control module 421 displays a scan setting screen in which the selection options for FILE_TYPE are limited to only "PDF" and "JPEG".

On the other hand, in step S906, in a case in which it has been determined in step S904 that the call parameter does not include the individual function restriction, the screen control module 421 will display a normal scan setting screen without any function restriction.

In step S907, the screen control module 421 stands by for a user operation. The screen control module 421 will advance the process to the next step when a user operation is detected.

In step S908, the screen control module 421 will determine the type of the detected user operation. If the type of the user operation is a scan execution instruction, the screen control module 421 will advance the process to step S909. Otherwise, the screen control module will advance the process to step S921.

In step S909, the scan execution module 422 generates an image file by reading an original from the scanner 221 in accordance with the settings made on the scan setting screen.

In step S910, the service cooperation module 423 discards the temporary combined restriction stored in step S903.

In step S911, the service cooperation module 423 transfers the image file generated in step S909 to the web browser 410 and ends the processing. Subsequently, the web browser 410 will continue the processing from step S817 of FIG. 8.

On the other hand, the process of step S921 and its subsequent processes are processes performed in a case in which the screen control module 421 determines in step S908 that the type of the user operation is an operation other than the scan execution instruction.

In step S921, the screen control module 421 performs processing corresponding to the user operation detected in step S907. For example, this can be processing to change the screen display in accordance with the setting values changed by the user.

In step S922, the screen control module 421 determines whether the user operation detected in step S907 is an operation related to the temporary combined restriction. If the user operation is an operation related to the temporary combined restriction, the screen control module 421 will advance the process to step S923. Otherwise, the screen control module will cause the process to return to step S907 to stand by for the next user operation.

In step S923, the screen control module 421 will disable each combination to be restricted based on the temporary combined restriction stored in step S903. In the case of the HTML document shown in FIG. 5A, combinations such as [A715, A717], [A715, A719], [A716, A718], and the like were restricted as described in steps S812 and S813 of FIG. 8. For example, if the function of the row A715 is enabled by the user operation detected in step S907, the screen control module 421 will not allow the functions of the rows A717 and A719 to be enabled since they are restricted from being combined with the function of the row A715. The function of the row A715 can be any one of the functions defined in the row A715. More specifically, if "JPEG" is selected as the value of FILE_TYPE (row A715), the screen control module will disable TWO_SIDED (row A717) so it will not be set to "true". In the same manner, the screen control module will place a restriction on SCAN_PAGE (row A719) so it will not exceed 1. In addition, if the function of the row A716 is enabled by the user operation detected in step S907, the screen control module 421 will not allow the function of the row A718 to be enabled since it is restricted from being combined with the row A716. More specifically, if "PDF" is selected as the value of FILE_TYPE (row A716), the screen control module will disable SPLIT_PAGE (row A718) so it will not be set to "true".

As described above, executing the procedures described in the embodiment allows a file to be scanned and uploaded under a setting satisfying the file restriction designated in the HTML document, and this can improve efficiency and productivity.

Second Embodiment

The second embodiment of the present invention will be described next. In the first embodiment, processing was performed so a scan will be executed under a setting satisfying the file restriction designated in an HTML document. On the other hand, among HTML documents that can be received from a web server, there are HTML documents without file restriction designations and HTML documents in which designations are missing. In a case requiring a restriction that cannot be set by the HTML protocol, there can be an HTML document in which a file restriction is presented to the user by text because the restriction cannot be designated as an input element attribute.

Therefore, the second embodiment will describe an embodiment in which, in addition to a file restriction designated by an input element in the HTML document, the file restriction designation lacking in the HTML document is supplemented by designating a file restriction or a scan restriction in SSB settings. Since the second embodiment is a modification of the first embodiment, only differences from the first embodiment will be described.

Software Arrangement

Figure 10:
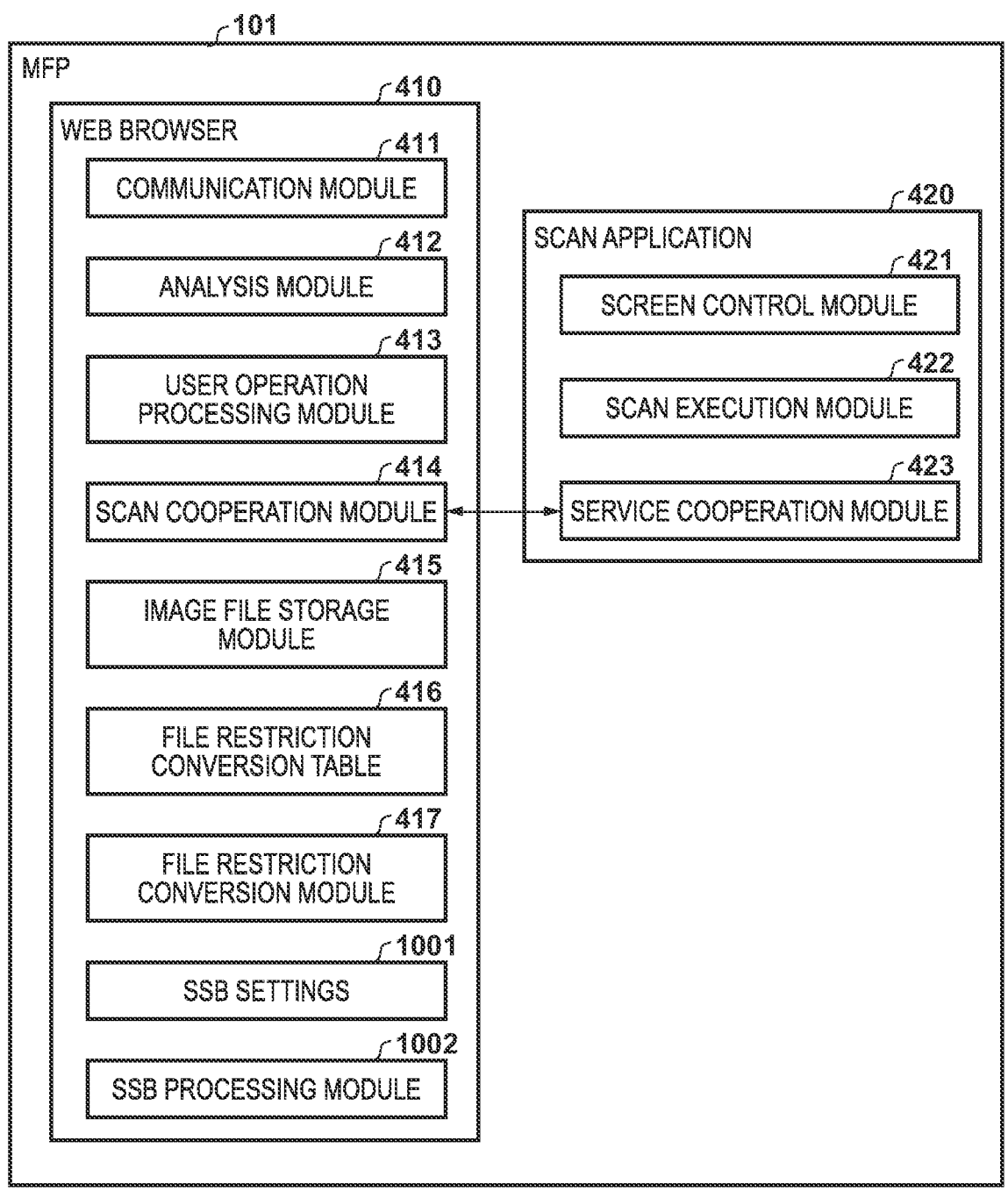
FIG. 10 is a block diagram showing the software arrangement of an MFP according to the second embodiment.

FIG. 10 is a block diagram showing an arrangement obtained by adding SSB settings 1001 and an SSB processing module 1002 to the block diagram of the software arrangement of an MFP 101 described in FIG. 4. Components other than the SSB settings 1001 and the SSB processing module 1002 are the same as those described in FIG. 4, and thus a description will be omitted.

The SSB (Site Specific Browser) settings 1001 are settings defining the settings to be applied to a web browser 410 on a website or URL basis. The SSB settings 1001 are set by an administrator or a serviceperson who wants to limit the way a specific website is used. For example, a setting related to the UI of the web browser 410 and a setting related to communication are designated in the SSB settings 1001. Preventing the display of the toolbar, restricting URL input, restricting the addition of favorites, and the like are examples of settings related to the UI of the web browser 410. A cookie processing method, restricting the display of a page in which HTTPS/HTTP are mixed, enabling/disabling the use of cache, and the like are examples of settings related to communication. In this embodiment, a file restriction or a scan restriction on a file upload form will be designated as one of the settings to be designated in the SSB settings 1001.

Although it is arranged so that the SSB settings 1001 are held by the web browser 410 in this embodiment, it may also be arranged so that the SSB settings will be provided in a server on a network and that the SSB settings will be obtained as needed from the server. In addition, it may be arranged so that the web browser 410 will synchronize with the SSB settings on the server each time the web browser is activated.

The SSB processing module 1002 reads the SSB settings 1001 and executes processing corresponding to the settings defined in the SSB settings 1001.

FIG. 11 is an example of the SSB settings 1001 according to this embodiment. Although the example shown in FIG. 11 is described in a JSON format, the present invention is not limited to this.

A designation 1101 designates the website to which the SSB settings are to be applied.

A designation 1102 designates a file restriction to be applied to the file upload form. The designation 1102 shown in FIG. 11 holds the same meaning as a case in which "accept="image/png"" is designated in the input element of the HTML document.

A designation 1103 designates scan restrictions to be applied to the file upload form. The designation 1103 shown in FIG. 11 limits the ranges of the scan resolution to "100×100 dpi" and "200×200 dpi" and the color designation at the time of scanning to "monochrome". Since scan restrictions are designated in the designation 1103 instead of a file restriction, the designation need not be bound to the HTML protocol.

File Upload Processing Procedure by Web Browser

Figures 1, 12A:
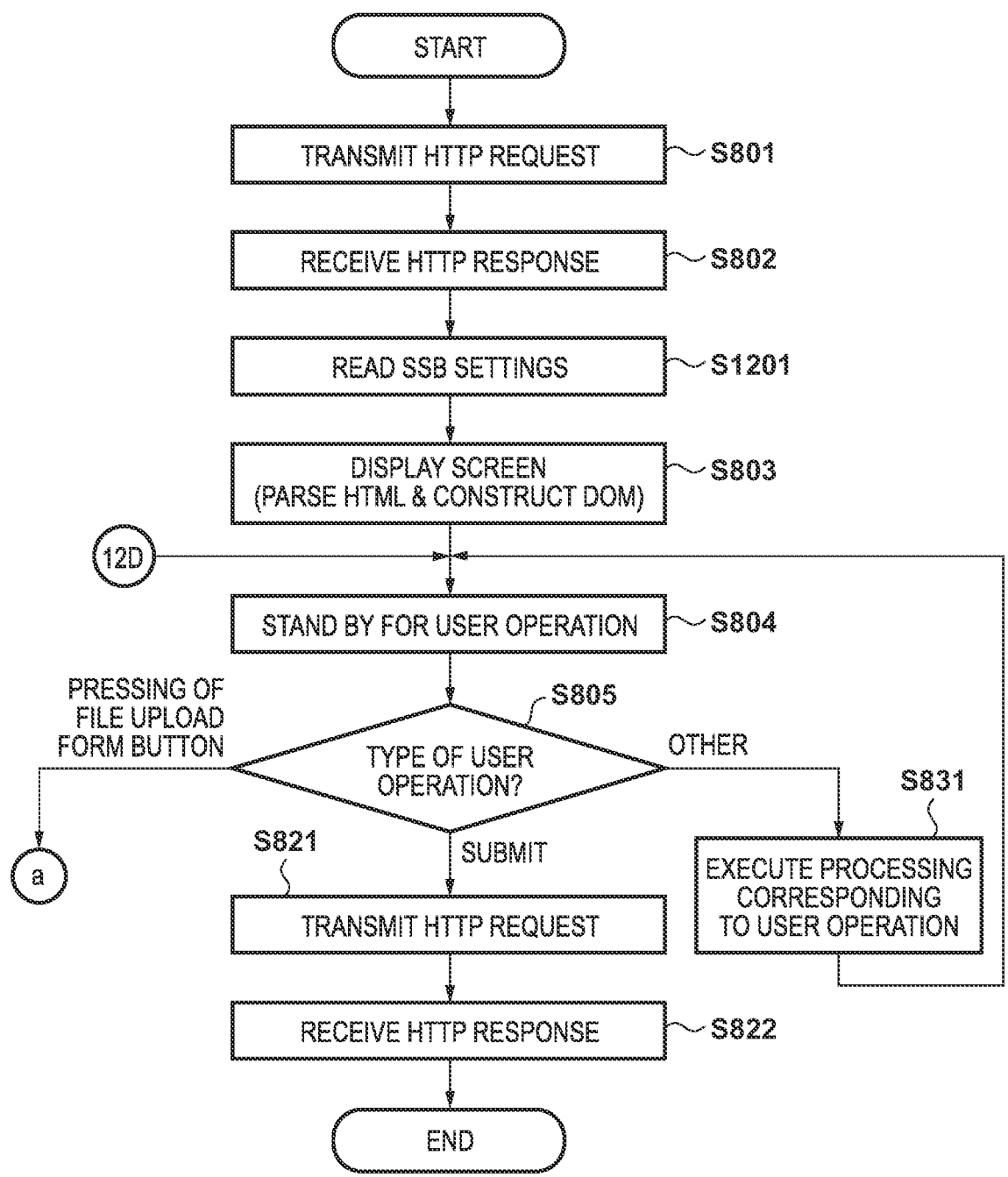
Figures 2, 12A:
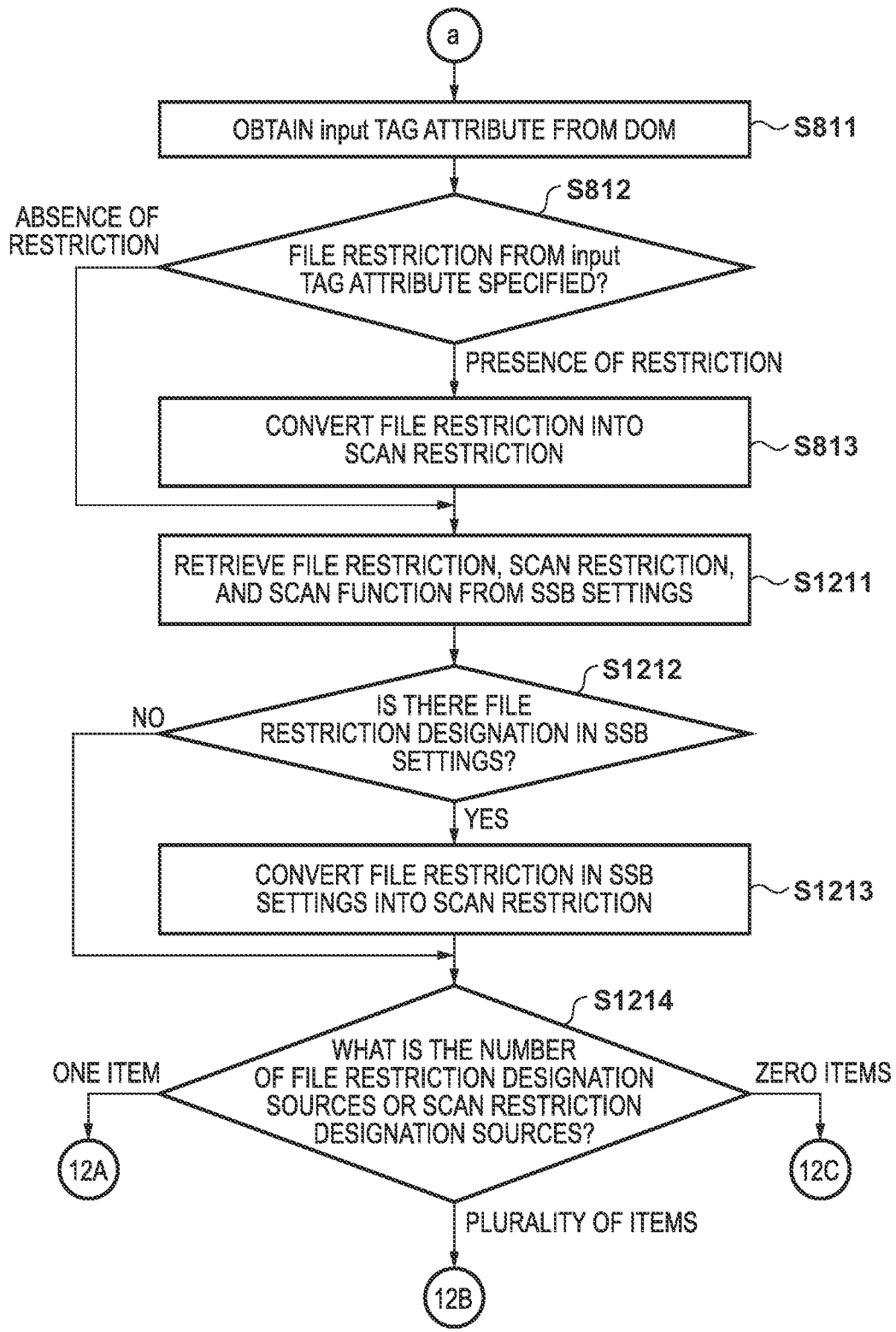
Figure 12B:
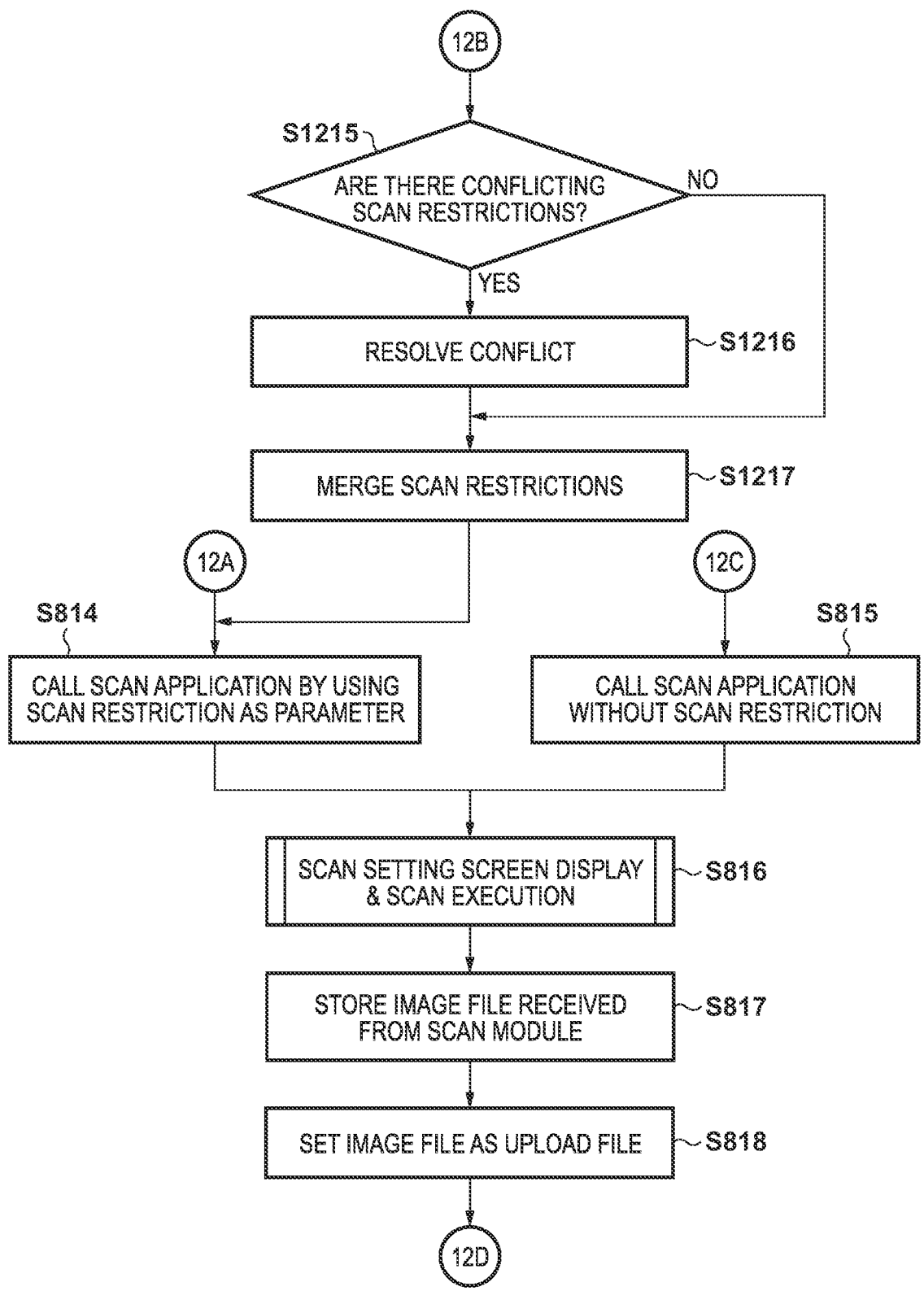

FIGS. 12A-1 to 12B are flowcharts which are modifications of FIG. 8. Since they are flowcharts that have been obtained by adding the processes of step S1201 and steps S1211 to S1217 to the flowchart described in FIG. 8, only the added steps will be described.

In step S1201, the SSB processing module 1002 reads the SSB settings 1001 corresponding to the website with which communication was executed in steps S801 and S802.

In step S1211, the SSB processing module 1002 retrieves the file restriction (1102) and the scan restrictions (1103) from the SSB settings 1001 read in step S1201. That is, the SSB processing module 1002 implements a restriction obtaining module that obtains restrictions described in the SSB settings.

In step S1211, if there is a file restriction in the SSB settings 1001 (that is, if a file restriction is retrieved in step S1211), the SSB processing module 1002 will advance the process to step S1213. Otherwise, the SSB processing module will advance the process to step S1214.

In step S1213, a file restriction conversion module 417 converts the file restriction (1102), which was retrieved from the SSB settings 1001 in step S1211, into a scan restriction by using a file restriction conversion table 416. That is, a setting conversion module that converts a file restriction obtained from the SSB settings into a scan function restriction is implemented by the file restriction conversion module 417. If the description method of the file restriction (1102) is the same as that of the accept attribute of the file upload form included in the HTTP response, a file restriction table 720 can be used. Otherwise, it suffices for a file restriction table to be prepared in accordance with the description of the file restriction (1102).

In step S1214, the file restriction conversion module 417 determines the number of file restriction designation sources or the number of scan restriction sources. For example, if a file restriction has been designated in both the HTML document and the SSB settings, it will be determined that there are a plurality of designation sources. In addition, if both a file restriction and a scan restriction have been designated in the SSB settings, it will be determined that there are a plurality of designation sources. If there is only one designation source, the file restriction conversion module 417 will advance the process to step S814. If there are a plurality of designation sources, the file restriction conversion module will advance the process to step S1215. If there is no designation source, the file restriction conversion module will advance the process to step S815.

In step S1215, the file restriction conversion module 417 determines whether there is a conflict between the scan restrictions designated by the plurality of designation sources. For example, a conflict can be determined because "image/png" is designated in the accept attribute in the designation 1102 shown in FIG. 11 although "image/jpeg, application/pdf" is designated in the accept attribute in a file upload form 501 shown in FIG. 5A. If a conflict is determined, the file restriction conversion module 417 will advance the process to step S1216. Otherwise, the file restriction conversion module will advance the process to step S1217.

In step S1216, the file restriction conversion module 417 resolves the conflict. More specifically, a priority is set for each designation source, and the scan restriction from a high-priority designation source will be enabled as the scan restriction with respect to conflicting items. In this embodiment, the priority is set in the order of "1. a file restriction in an HTML document", "2. a file restriction in SSB settings", and "3. a scan restriction in SSB settings", and the priority is lowered in order from 1. However, the present invention is not limited to this. As an example of conflict resolution, in the case of the conflict between the file upload form 501 in FIG. 5A and the file restriction (1102) in FIG. 11, the designation of the accept attribute of the file upload form 501 in FIG. 5A is enabled, and the designation of the accept attribute of the file restriction (1102) in FIG. 11 is discarded in accordance with the priority.

In step S1217, the file restriction conversion module 417 merges the scan restrictions designated by the designation of a plurality of designation sources and sets the merged scan restriction as the parameter to be used to call the scan application in step S814. For example, the scan restriction converted from a file restriction and the scan restrictions (1103) designated in the SSB settings are merged. Subsequently, the merged scan restriction is transferred to a scan application 420, and a scan is executed (step S816) in the same manner as in the first embodiment.

As described above, executing the procedures described in the embodiment allows a file restriction designation lacking in the HTML document to be supplemented by designating a file restriction or a scan restriction in the SSB settings.

Third Embodiment

The third embodiment of the present invention will be described next. The first and second embodiments described processing in which a scan restriction is executed by making a designation in an HTML document or a designation in SSB settings. On the other hand, there are cases in which it is preferable to designate a necessary scan function instead of placing a restriction on a scan function. For example, in the case of a web application for receipt management, the web application will have a receipt uploading function. In a case in which a receipt is to be scanned and uploaded from an MFP, the convenience of the user will be improved if there is a multicrop function (a function in which a plurality of receipts are read by a single scan and are automatically cut out as separate sets of image data).

On the other hand, a necessary scan function will vary depending on the web application. Thus, it is difficult to prepare a scan application that satisfies the requirements of all web applications in advance. Therefore, the third embodiment will describe an embodiment that can dynamically call a scan application that has the scan function required by a website from a plurality of scan applications. Since the third embodiment is a modification of the second embodiment, only the differences from the second embodiment will be described.

Software Arrangement

Figure 13:
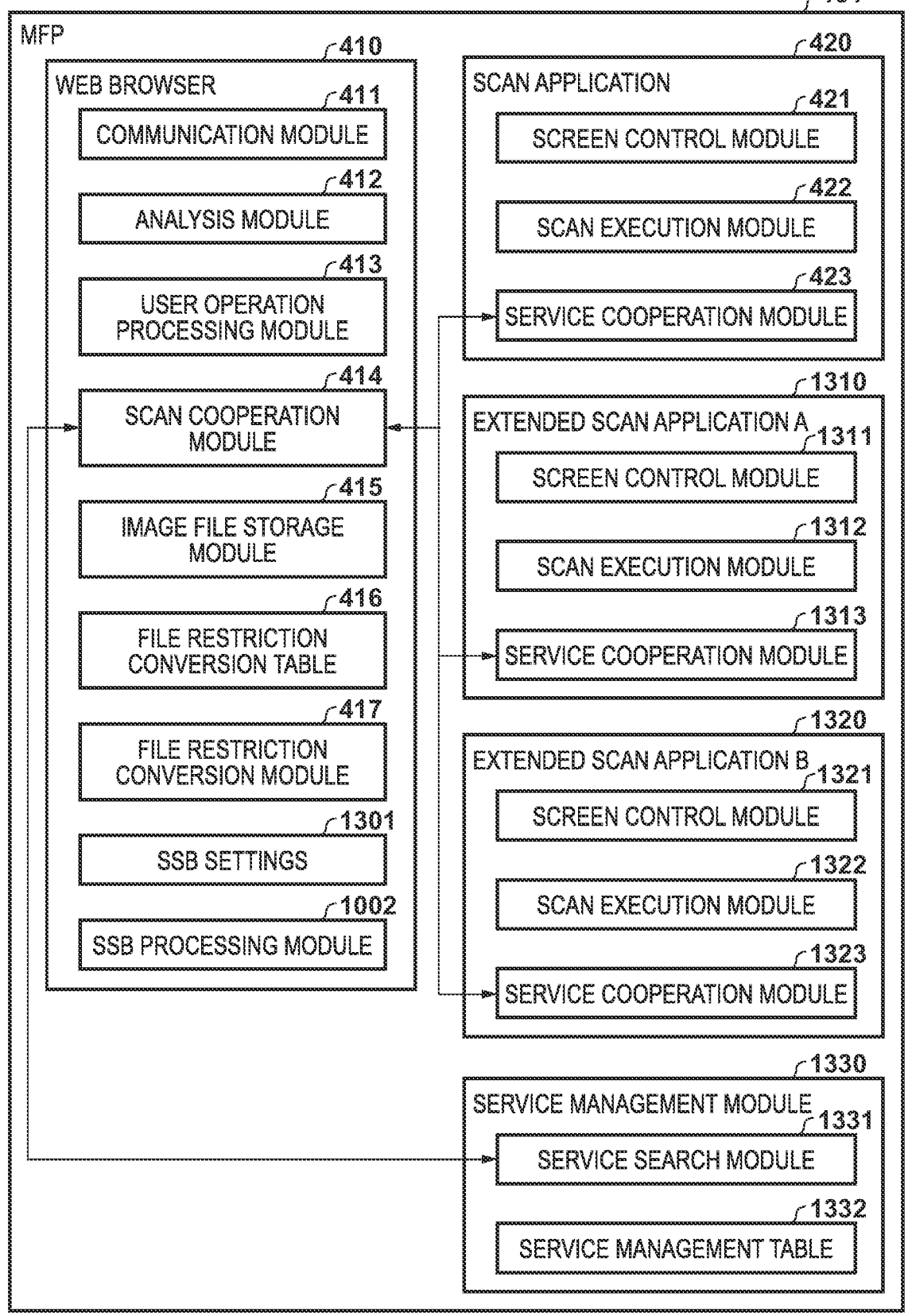
FIG. 13 is a block diagram showing the software arrangement of an MFP according to the third embodiment.

FIG. 13 is a is a block diagram showing an arrangement obtained by adding an extended scan application A 1310, an extended scan application B 1320, and a service management module 1330 to the block diagram of the software arrangement of an MFP 101 described in FIG. 10. In addition, SSB settings 1001 have been changed to SSB settings 1301. Other components are the same as those described in FIG. 10, and thus a description will be omitted.

The SSB settings 1301 are SSB settings extending from the SSB settings 1001 used in the second embodiment, and designate the scan function required by a website.

FIGS. 14A and 14B show examples of the SSB settings 1301 according to this embodiment. Two examples of SSB settings are shown in FIGS. 14A and 14B. FIG. 14A shows an example of SSB settings in which a multicrop function has been designated as the scan function required for the website. In a scan function 1401, the multicrop function is designated as the scan function required for the website. FIG. 14B shows an example of SSB settings in which a character recognition function, in particular, an OCR function (optical character recognition function) has been designated as the scan function required for the website. In a scan function 1402, the OCR function is designated as the scan function required for the website. Furthermore, English ("en") and Japanese ("ja") are designated as the OCR-enabled languages.

The description will return to the explanation of FIG. 13. The extended scan application A 1310 and the extended scan application B 1320 are scan applications that have different scan functions from a scan application 420 which is a standard scan application. In addition, the extended scan application A 1310 and the extended scan application B 1320 each have a service cooperation function in the same manner as the scan application 420. The extended scan application A 1310 and the extended scan application B 1320 are pieces of software that have been added to the MFP 101 as functions to expand the MFP 101 at the time of shipment from the factory or after the shipment from the factory. Although two extended scan applications are defined in this embodiment, the number of extended scan applications is not limited to two.

Each of the extended scan application A 1310 and the extended scan application B 1320 includes, in the same manner as the scan application 420, a screen control module, a scan execution module, and a service cooperation module. Since these components are the same as those of the scan application 420, a description will be omitted.

The service management module 1330 manages each application (to be referred to as a service cooperation application hereinafter) that has the service cooperation function. The service management module 1330 includes a service search module 1331 and a service management table 1332.

The service search module 1331 searches and obtains a service cooperation application when it receives an instruction from a software module in the MFP 101. In this embodiment, the service search module will search for an application that has a scan function upon receiving a request from a web browser 410.

The service management table 1332 is a table for managing information of the service cooperation application.

FIG. 15 shows an example of the service management table 1332. The service management table 1332 includes a column of an ID 1501, a column of a type 1502, a column of an enabled function 1503, a column of a priority 1504, and a column of an application ID 1505. Each row of the service management table 1332 corresponds to one service cooperation application.

The column of the ID 1501 is a column defining the identifiers for specifying the respective rows of the table. Note that values shown in the column of the ID 1501 will be used to designate the rows of the table in the following description. For example, a row whose value in the column of the ID 1501 is "C1511" will be described as "a row C1511".

The column of the type 1502 is a column defining the type of the function in each service cooperation application.

The column of the enabled function 1503 is a column defining the function and its range in each service cooperation application.

The column of the priority 1504 is the search result priority used when the service search module 1331 searches for a service cooperation application. In a case in which there are a plurality of search results, the service cooperation application with the smallest number in the column of the priority 1504 will be selected as the search result.

The column of the application ID 1505 is a column defining the identifier of an application corresponding to each row.

File Upload Processing Procedure by Web Browser

Figures 1, 16A:
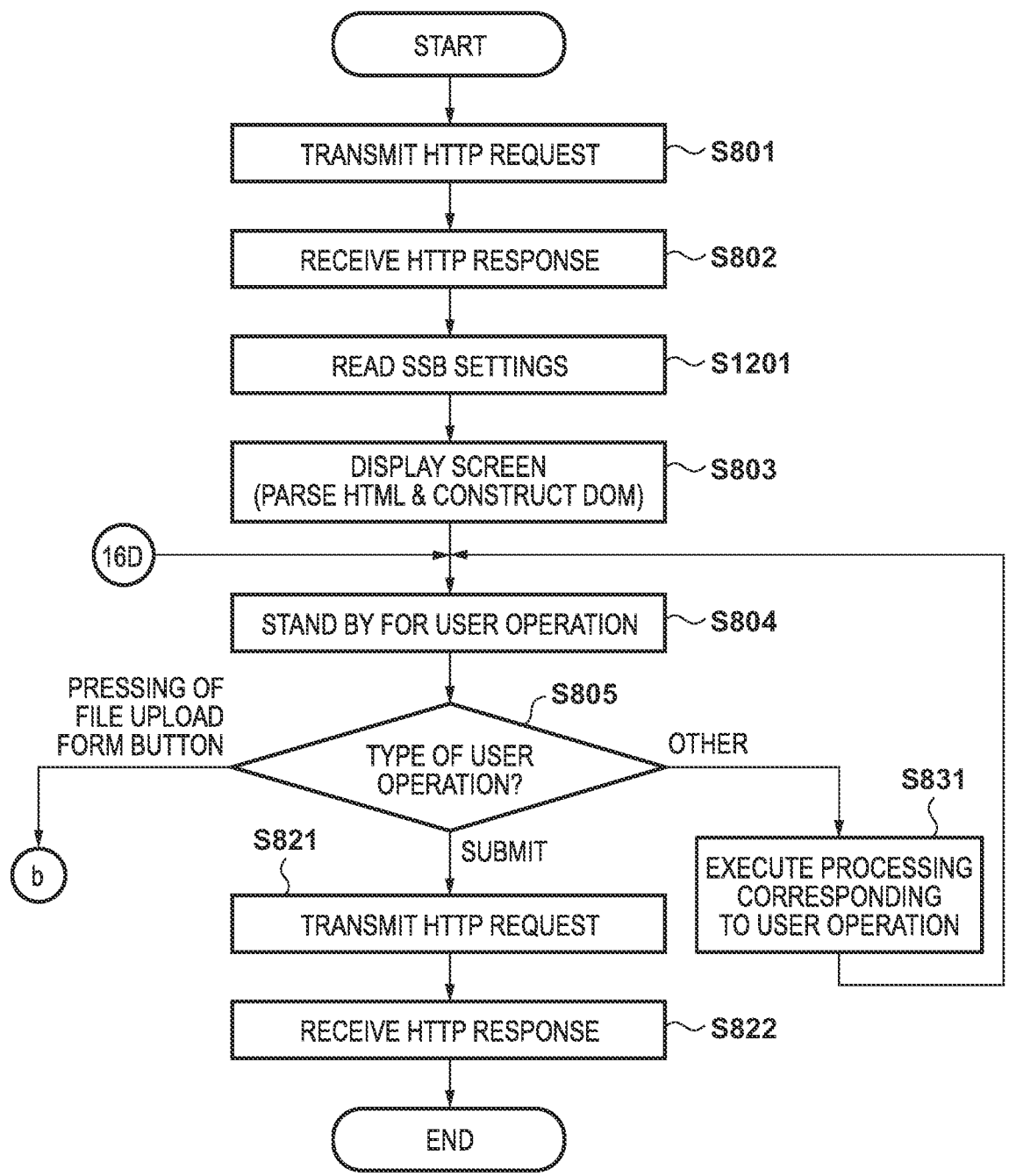
Figures 2, 16A:
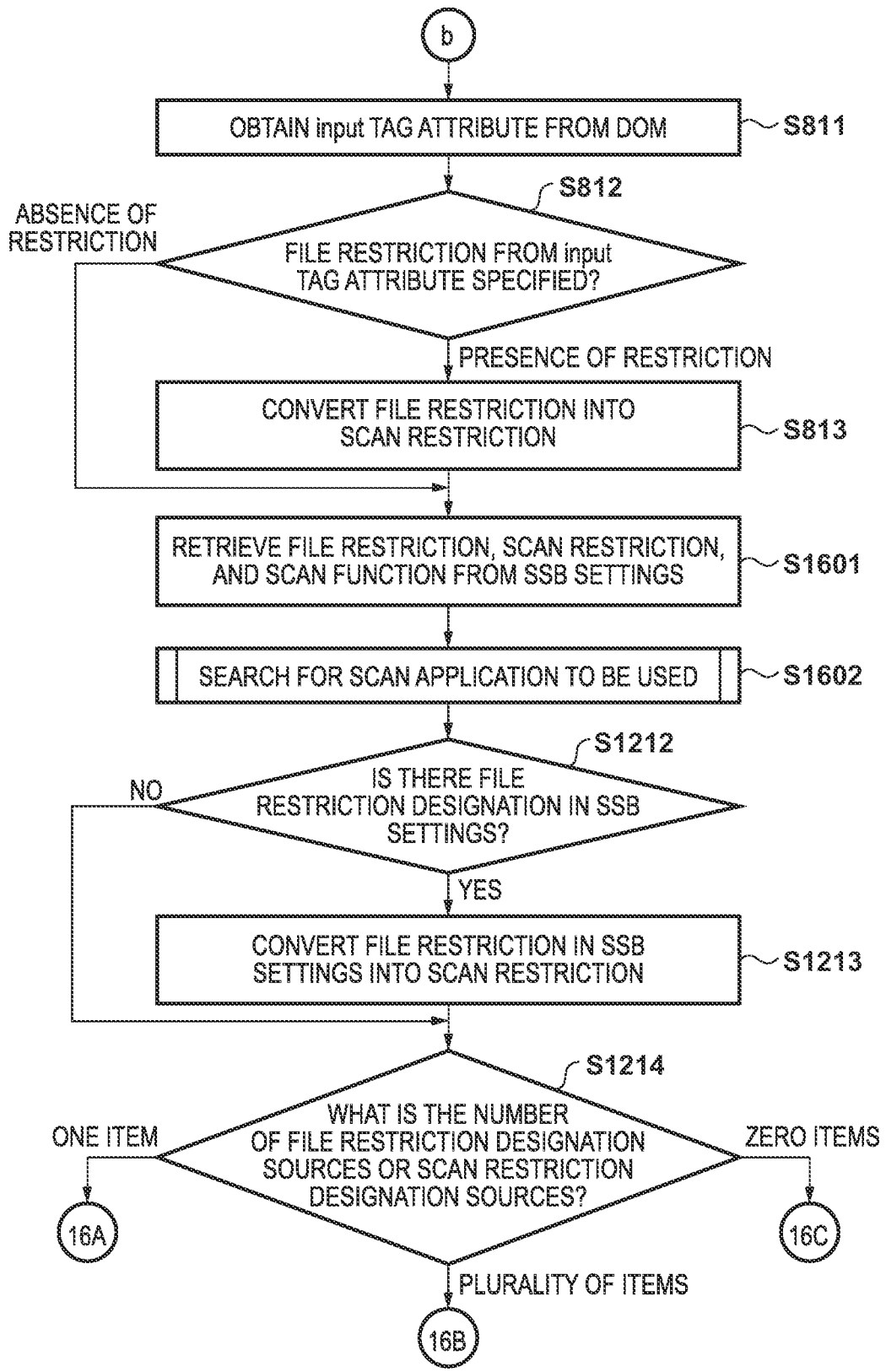
Figure 16B:
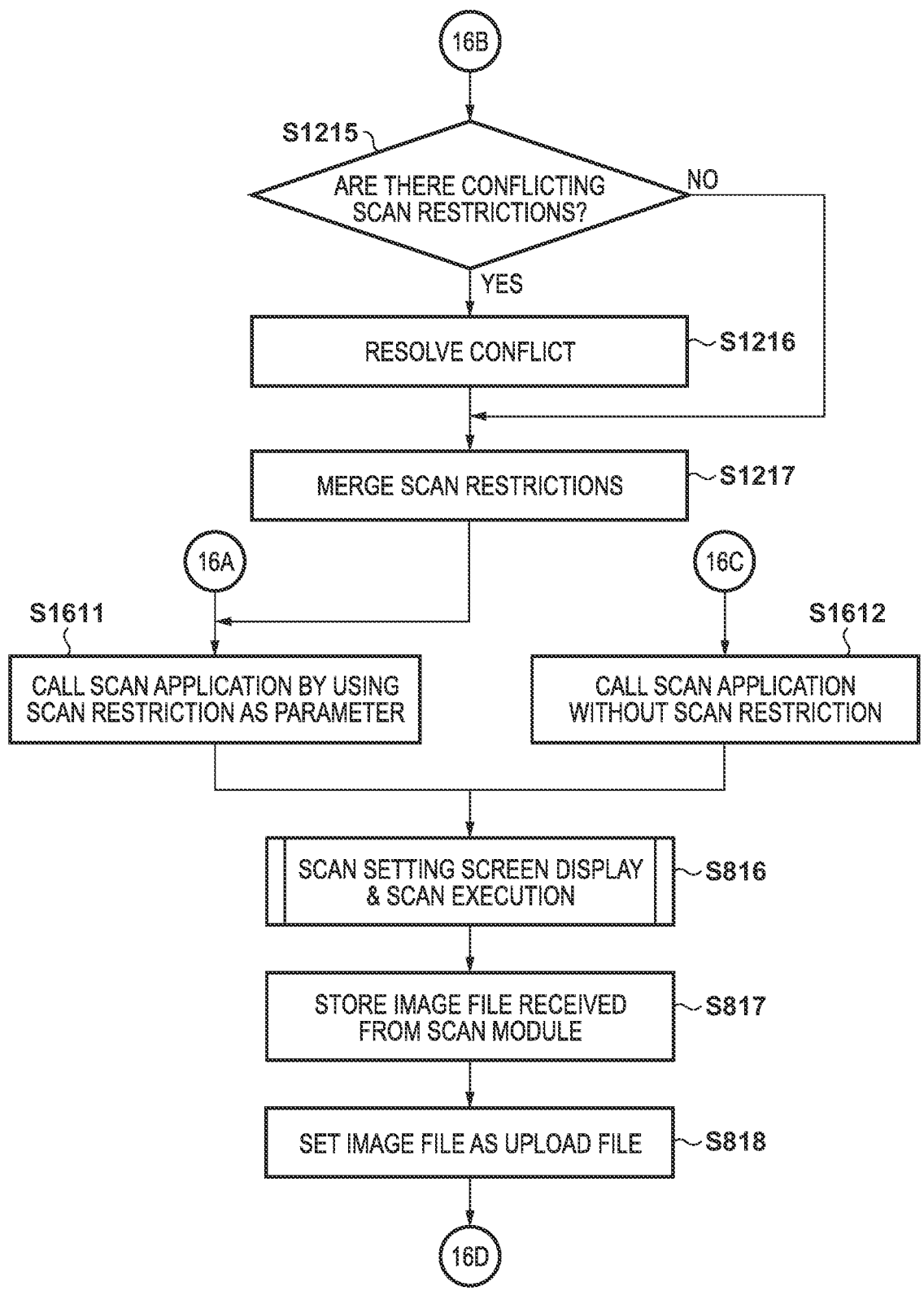

FIGS. 16A-1 to 16B are flowcharts which are modifications of FIGS. 12A-1 to 12B. With respect to the flowcharts described in FIGS. 12A-1 to 12B, step S1211 has been changed to step S1601, step S1602 has been added, step S814 has been changed to S1611, and step S815 has been changed to S1612. Only the added and changed steps will be described hereinafter.

In step S1601, an SSB processing module 1002 retrieves a file restriction (1102), scan restrictions (1103), a scan function (1401 or 1402) from the SSB settings 1301 read in step S1201. That is, the SSB processing module 1002 will implement, in addition to the file restriction and the scan restrictions described in the SSB settings, a scan function obtaining module to obtain a scan function.

In step S1602, a scan cooperation module 414 will request the service search module 1331 to search for a service cooperation application. At the time of the search request, the scan cooperation module 414 designates the "scan application" as the type of the search-target application and the scan function retrieved in step S1601 as a search condition. The processing performed by the service search module 1331 which accepts the search request will be described later with reference to FIG. 17. The scan cooperation module 414 receives, as the search result, information indicating what will be the scan application to be used in the subsequent processing. In this embodiment, the scan cooperation module will receive one of the scan application 420, the extended scan application A 1310, and the extended scan application B 1320 as the search result.

In step S1611, the scan cooperation module 414 calls the scan application obtained as the search result in step S1602. At this time, the scan cooperation module 414 calls the scan restrictions specified in step S812 and transfers each scan restriction as the call parameter to the scan application.

On the other hand, the process of step S1612 is a process performed when it is determined that a file restriction is not present in step S812, and the scan cooperation module 414 will call the scan application obtained as the search result in step S1602 without including a scan restriction as the call parameter.

Scan Application Search Processing

FIG. 17 is a flowchart defining the processing to be performed by the service search module 1331 when a search request is received from the scan cooperation module 414 in step S1602 in the flowcharts of FIGS. 16A-1 to 16B. Each step in the flowchart of FIG. 17 is executed by a CPU 211 reading out a program stored in an HDD 214 of the MFP 101 to a RAM 213 and analyzing and executing the program.

In step S1701, the service search module 1331 receives a search request from the scan cooperation module 414. At this time, the service search module receives, as a parameter, a piece of information indicating that the type of the search-target application is a "scan application". In addition, the service search module will similarly receive a scan function designation as the search condition of the application if such a designation is present.

In step S1702, the service search module 1331 determines whether the search instruction parameter received in step S1701 includes a search condition designation. If a search condition designation is included, the service search module 1331 will advance the process to step S1703. Otherwise, the service search module will advance the process to step S1705.

In step S1703, the service search module 1331 narrows down the scan applications to each scan application that satisfies the search condition designated in step S1701. More specifically, the service search module 1331 retrieves, from the service management table 1332, each row in which the scan function designated as the search condition has been included as a definition in its column of the enabled function 1503. For example, if the scan function 1401 (multicrop: true) shown in FIG. 14A has been designated, the service search module will retrieve a row C1513. In the same manner, if the scan function 1402 (ocr:["en","ja"]) shown in FIG. 14B has been designated, the service search module will retrieve a row C1512 and the row C1513.

In step S1704, the service search module 1331 determines the narrow-down result of step S1704. If 0 items have been found as a result, the process advances to step S1705. If one item has been found as a result, the process advances to step S1706. If two or more items have been found as a result, the process advances to step S1707.

In step S1705, the service search module 1331 confirms, as the search result, the application with the highest priority among the scan applications defined in the service management table 1332. In the example shown in FIG. 15, the scan application 420 (DEFAULT_SCAN_APP) corresponding to the row C1511 is confirmed as the search result.

In step S1706, the service search module 1331 confirms, as the search result, the narrow down result obtained in step S1704.

In step S1707, the service search module 1331 confirms, as the search result, the application with the highest priority among the narrowed-down applications obtained in step S1704.

In step S1708, the service search module 1331 transmits the search result, confirmed in the previous step, as a response to the scan cooperation module 414 and ends the processing.

As described above, executing the procedures described in the embodiment allows a scan application which has a scan function required by a website to be called, and this improves user convenience and productivity.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-065497, filed Mar. 29, 2018 which is hereby incorporated by reference herein in its entirety.

What is claimed is:

1. An image forming apparatus that has a scan function, comprising:

a restriction converter configured to convert, in a case in which a file upload and a file restriction are designated in a web content received from a web server, the file restriction into a scan function restriction;

a scan cooperation unit configured to call, in accordance with a file input instruction made by a user for the designation of the file upload, the scan function with the restriction converted by the restriction converter; and a transmitter configured to transmit a file generated by the scan function called by the scan cooperation unit to the web server.

2. The apparatus according to claim 1, wherein the scan function restriction by the restriction converter includes at least one of an individual function restriction that restricts an individual function and a combined restriction that restricts a combination of functions.

3. The apparatus according to claim 1, further comprising:
a restriction obtaining unit configured to obtain a file restriction and a scan function restriction or one of the file restriction and the scan function restriction included in a setting for each website or URL; and
a setting converter configured to convert the file restriction obtained by the restriction obtaining unit into a scan function restriction,
wherein the scan cooperation unit calls the scan function with the scan function restriction obtained by the restriction obtaining unit and the setting converter in addition to the restriction converted by the restriction converter.

4. The apparatus according to claim 3, further comprising:
a conflict resolver configured to resolve, in a case in which there is a conflict between the scan function restrictions obtained by the restriction converter, the restriction obtaining unit, and the setting converter, the conflict by disabling a restriction with lower priority among the conflicting scan function restrictions.

5. The apparatus according to claim 1, further comprising:
a scan function obtaining unit configured to obtain a designation of the scan function included in a setting for each website or URL,
wherein the scan cooperation unit calls a scan function that has a function whose designation is obtained by the scan function obtaining unit.

6. The apparatus according to claim 5, wherein the scan function includes a plurality of scan functions, and
the scan cooperation unit calls, from the plurality of scan functions, a scan function designated by the designation obtained by the scan function obtaining unit.

7. The apparatus according to claim 6, wherein the plurality of scan functions have a character recognition function and a multicrop function in which a plurality of image files are cut out from image data read by a single scan or have one of the character recognition function and the multicrop function.

8. The apparatus according to claim 1, wherein the file restriction includes a file type, enabling/disabling uploading of a plurality of files, and a combined restriction of the file type and the enabling/disabling the uploading of the plurality of files.

9. The apparatus according to claim 1, further comprising:
a generator configured to generate a screen corresponding to the web content and cause a display unit of the image forming apparatus to display the screen,
wherein the scan function restriction by the restriction conversion unit is displayed as an unselectable scan function in the screen.

10. The apparatus according to claim 1, further comprising a web browser,
wherein the web browser provides the restriction conversion unit, the scan cooperation unit, and the transmitter.

11. A method of controlling an image forming apparatus that has a scan function, the method comprising:
converting, in a case in which a file upload and a file restriction are designated in a web content received from a web server, the file restriction into a scan function restriction;
calling, in accordance with a file input instruction made by a user for the designation of the file upload, the scan function with the converted restriction; and
transmitting a file generated by the called scan function to the web server.

12. A non-transitory computer-readable storage medium storing a program for causing a computer that has a scan function to convert, in a case in which a file upload and a file restriction are designated in a web content received from a web server, the file restriction into a scan function restriction;
call, in accordance with a file input instruction made by a user for the designation of the file upload, the scan function with the converted restriction; and
transmit a file generated by the called scan function to the web server.

* * * * *